US012641645B2

(12) United States Patent
Li et al.

(10) Patent No.: US 12,641,645 B2
(45) Date of Patent: May 26, 2026

(54) PROTOCOL DATA UNIT PPDU TRANSMISSION METHOD AND APPARATUS

(71) Applicant: HUAWEI TECHNOLOGIES CO., LTD., Shenzhen (CN)

(72) Inventors: Yunbo Li, Shenzhen (CN); Ming Gan, Shenzhen (CN); Jian Yu, Shenzhen (CN); Yuchen Guo, Shenzhen (CN); Yiqing Li, Shenzhen (CN); Guogang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 427 days.

(21) Appl. No.: 18/331,185

(22) Filed: Jun. 8, 2023

(65) Prior Publication Data

US 2023/0319889 A1      Oct. 5, 2023

Related U.S. Application Data

(63) Continuation of application No. PCT/CN2021/131521, filed on Nov. 18, 2021.

(30) Foreign Application Priority Data

Dec. 18, 2020      (CN) .......................... 202011511846.3

(51) Int. Cl.
*H04W 74/0816* (2024.01)
*H04W 74/08* (2024.01)
(52) U.S. Cl.
CPC ... *H04W 74/0816* (2013.01); *H04W 74/0866* (2013.01)

(58) Field of Classification Search
CPC .......... H04W 74/0816; H04W 74/0866; H04L 5/0037; H04L 5/0044; H04L 5/0094; Y02D 30/70
See application file for complete search history.

(56) References Cited

U.S. PATENT DOCUMENTS 9,271,309 B2 * 2/2016 Kim ................. H04W 74/0816
10,701,686 B1 * 6/2020 Kwon ................. H04W 74/004
(Continued)

FOREIGN PATENT DOCUMENTS

CN      107645787 A      1/2018

OTHER PUBLICATIONS

IEE 802.11-20/1583r1, Jarkko Kneckt et al., MU-RTS to SST-STAs, Oct. 2020, 18 pages.

*Primary Examiner* — Kashif Siddiqui

(57) ABSTRACT

This application provides a protocol data unit PPDU transmission method and apparatus, and relates to the field of communication technologies, to indicate, to a STA, a channel for sending a CTS frame. In the method, a first device may send a first data unit. The first data unit may include at least a second data unit and a third data unit. The second data unit is used to carry a first MU-RTS frame. The third data unit is used to carry a second MU-RTS frame. The first MU-RTS frame and the second MU-RTS frame use a same scrambling code initialization value. Based on the foregoing solution, an AP may indicate, to a plurality of STAs by using a plurality of MU-RTS frames, channels for replying CTS frames. The AP may indicate the first MU-RTS frame and the second MU-RTS frame to use the same scrambling code initialization value.

11 Claims, 10 Drawing Sheets

(56) References Cited

U.S. PATENT DOCUMENTS

| 2011/0194542 A1* | 8/2011 | Kim | .................. | H04W 74/0816 |
| | | | | 370/338 |
| 2017/0104563 A1* | 4/2017 | Lee | .................... | H04W 72/121 |
| 2018/0092127 A1 | 3/2018 | Park | | |
| 2023/0188309 A1* | 6/2023 | Li | ........................ | H04L 5/0064 |
| | | | | 370/329 |

* cited by examiner

Wireless access point
(AP 1)

STA 1                    STA 2

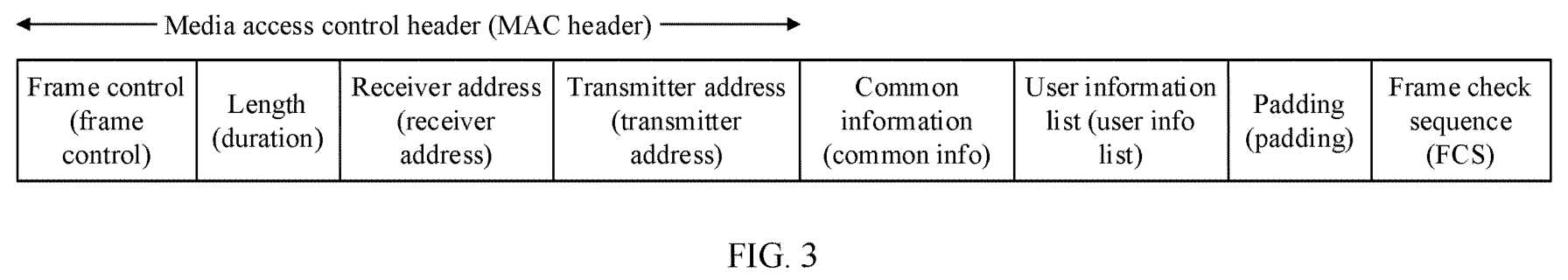

← Media access control header (MAC header) →

| Frame control (frame control) | Length (duration) | Receiver address (receiver address) | Transmitter address (transmitter address) | Common information (common info) | User information list (user info list) | Padding (padding) | Frame check sequence (FCS) |
|---|---|---|---|---|---|---|---|

FIG. 3

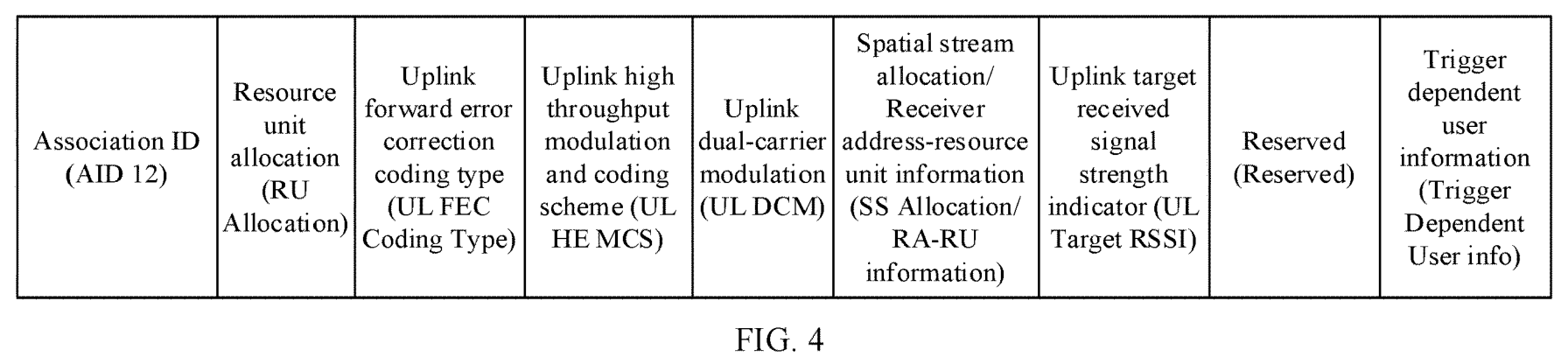

| Association ID (AID 12) | Resource unit allocation (RU Allocation) | Uplink forward error correction coding type (UL FEC Coding Type) | Uplink high throughput modulation and coding scheme (UL HE MCS) | Uplink dual-carrier modulation (UL DCM) | Spatial stream allocation/ Receiver address-resource unit information (SS Allocation/ RA-RU information) | Uplink target received signal strength indicator (UL Target RSSI) | Reserved (Reserved) | Trigger dependent user information (Trigger Dependent User info) |
|---|---|---|---|---|---|---|---|---|

FIG. 4

| | | |
|---|---|---|
| Channel 8 | Multi-user request to send (MU-RTS 1) (station STA 1) | Clear to send CTS (station STA 1) (station STA 2) |
| Channel 7 | Multi-user request to send (MU-RTS 1) (station STA 1) | Clear to send CTS (station STA 1) (station STA 2) |
| Channel 6 | Multi-user request to send (MU-RTS 1) (station STA 1) | Clear to send CTS (station STA 1) (station STA 2) |
| Channel 5 | Multi-user request to send (MU-RTS 1) (station STA 1) | Clear to send CTS (station STA 1) (station STA 2) |
| Channel 4 | Multi-user request to send (MU-RTS 2) (station STA 2) | Clear to send CTS (station STA 2) |
| Channel 3 | Multi-user request to send (MU-RTS 2) (station STA 2) | Clear to send CTS (station STA 2) |
| Channel 2 | Multi-user request to send (MU-RTS 2) (station STA 2) | Clear to send CTS (station STA 2) |
| Channel 1 | Multi-user request to send (MU-RTS 2) (station STA 2) | Clear to send CTS (station STA 2) |

FIG. 8

PROTOCOL DATA UNIT PPDU TRANSMISSION METHOD AND APPARATUS

CROSS-REFERENCE TO RELATED APPLICATIONS

This application is a continuation of International Application No. PCT/CN2021/131521, filed on Nov. 18, 2021, which claims priority to Chinese Patent Application No. 202011511846.3, filed on Dec. 18, 2020. The disclosures of the aforementioned applications are hereby incorporated by reference in their entireties.

TECHNICAL FIELD

This application relates to the field of communication technologies, and in particular, to a protocol data unit (PPDU) transmission method and apparatus.

BACKGROUND

Currently, a basic framework commonly used in a wireless access standard is that a wireless access point (AP) accesses the Internet in a wired or wireless manner. In addition, the AP is associated with a plurality of stations, and uplink and downlink communication may be performed between the AP and the plurality of associated stations. A channel for communication between the AP and the plurality of associated stations may support a maximum bandwidth of 320 MHz, and each associated station may communicate with the AP on a specified channel.

Because a hidden node is common in a wireless local area network, a channel may be reserved for the associated station in a request to send (RTS)/clear to send (CTS) interaction manner. An RTS frame and a CTS frame may be sent in a non-high throughput (non-high throughput duplicated, Non-HT duplicated) manner on a bandwidth greater than 20 MHz. Currently, a bandwidth that may be used to send a CTS frame is one of 20 MHz, 40 MHz, 80 MHz, 160 (80+80) MHz, and 320 MHz, and occupied channels are respectively a primary 20 MHz channel, a primary 40 MHz channel, a primary 80 MHz channel, a primary 160 MHz channel, and a 320 MHz channel.

To improve efficiency of channel protection, a multi-user request to send (multiple user-RTS, MU-RTS)/CTS interaction mechanism is introduced. A principle of the MU-RTS/CTS interaction mechanism is that an AP sends an MU-RTS frame in a broadcast manner. The MU-RTS frame carries identifiers of a plurality of receive stations, and specifies, for each receive station, information about a bandwidth for replying a CTS. After the MU-RTS frame ends, each receive station replies and sends a CTS frame on the specified bandwidth after short inter-frame space (SIFS) time. The specified bandwidth herein is a 20 MHz channel, a 40 MHz channel, an 80 MHz channel, or a 160 MHz channel, that includes a primary 20 MHz subchannel.

In addition, to make full use of a channel resource, a subchannel selective transmission (SST) mechanism may be used to schedule a 20 MHz or 80 MHz station to a secondary channel, to send and receive data. A working principle of the subchannel selective transmission mechanism is that an AP may schedule a station to receive downlink data on a specified secondary channel or send uplink data through scheduling within optimized target wake-up time (TWT). The station scheduled to operate on the secondary channel may be referred to as an SST station.

However, an operating channel of the SST station does not include a primary 20 MHz channel, and a channel occupied for sending the CTS needs to include the primary 20 MHz channel. That is, the station SST cannot complete RTS/CTS or MU-RTS/CTS channel protection.

SUMMARY

This application provides a protocol data unit PPDU transmission method and apparatus, to allocate, to an SST STA, a channel for sending a CTS frame.

According to a first aspect, an MU-RTS frame transmission method is provided. The method may be performed by a first device provided in embodiments of this application. The first device may be an AP or a chip that implements a function similar to that of the AP. In the method, the first device may send an MU-RTS frame. The MU-RTS frame may include indication information indicating a first channel. The first channel herein is a first channel on which a second device sends a CTS frame. The first channel includes a target channel of the second device. The target channel may be a 20 MHz subchannel in an operating channel of an SST STA. Alternatively, the target channel may be any 20 MHz subchannel other than a primary 20 MHz channel.

Based on the foregoing solution, an AP may indicate, to an SST STA based on the indication information, a channel for replying a CTS frame, so that the SST STA may also reserve the channel according to an MU-RTS/CTS mechanism, to reduce interference during data receiving and sending.

In a possible implementation, the indication information may include a first bit sequence. The first bit sequence indicates the first channel. Optionally, the indication information further includes a second bit sequence. A value of the second bit sequence is 1 or in a reserved state.

Based on the foregoing solution, the AP may indicate, to the SST STA based on the first bit sequence in the MU-RTS frame, the channel for replying the CTS frame. In addition, because the operating channel of the SST STA does not include the primary 20 MHz channel, the value of the second bit sequence is set to 1 or in the reserved state, to distinguish from a STA whose operating channel includes the primary 20 MHz channel.

According to a second aspect, a CTS frame transmission method is provided. The method may be performed by a second device provided in embodiments of this application. The second device may be an SST STA or a chip that implements a function similar to that of the SST STA. In the method, the second device may receive an MU-RTS frame. The MU-RTS frame may include indication information. The indication information herein may indicate a first channel. The second device may send a CTS frame on the first channel. The first channel includes a target channel of the second device.

Based on the foregoing solution, an AP may indicate, to an SST STA based on the indication information, a channel for replying a CTS frame, so that the SST STA may also reserve the channel according to an MU-RTS/CTS mechanism, to reduce interference during data receiving and sending.

In a possible implementation, the indication information may include a first bit sequence. The first bit sequence indicates the first channel. Optionally, the indication information further includes a second bit sequence. A value of the second bit sequence is 1 or in a reserved state.

Based on the foregoing solution, the AP may indicate, to the SST STA based on the first bit sequence in the MU-RTS frame, the channel for replying the CTS frame. In addition, because an operating channel of the SST STA does not include a primary 20 MHz channel, the value of the second bit sequence is set to 1 or in the reserved state, to distinguish from a STA whose operating channel includes the primary 20 MHz channel.

According to a third aspect, a protocol data unit PPDU transmission method is provided. The method may be performed by a first device provided in embodiments of this application. The first device may be an AP or a chip that implements a function similar to that of the AP. In the method, a first device may send a first data unit. The first data unit may include at least a second data unit and a third data unit. The second data unit is used to carry a first MU-RTS frame. The third data unit is used to carry a second MU-RTS frame. The first MU-RTS frame and the second MU-RTS frame use a same scrambling code initialization value.

Based on the foregoing solution, an AP may indicate, to a plurality of STAs by using a plurality of MU-RTS frames, channels for replying CTS frames. The AP may indicate the first MU-RTS frame and the second MU-RTS frame to use the same scrambling code initialization value. This can avoid a conflict between different CTS frames.

In a possible implementation, the first MU-RTS frame indicates a first channel on which a second device sends a clear to send CTS frame. The second MU-RTS frame indicates a second channel on which a third device sends a CTS frame. When a bandwidth of the first channel partially or completely overlaps a bandwidth of the second channel, the first MU-RTS frame and the second MU-RTS frame use a same scrambling code initialization value.

Based on the foregoing solution, when bandwidths of the channels on which the plurality of STAs reply the CTS frames overlap, the AP may enable MU-RTS frames indicating the overlapping channels to use a same scrambling code initialization value. This can avoid a conflict between different CTS frames.

In a possible implementation, the first data unit may include a plurality of data units. Each of the plurality of data units is used to carry an MU-RTS frame. Scrambling code initialization values of all MU-RTS frames are the same. The second data unit and the third data unit are two of the plurality of data units.

Based on the foregoing solution, the AP may enable all scrambling code initialization values of a plurality of sent MU-RTS frames to be the same. This can avoid a conflict between different CTS frames.

In a possible implementation, the first MU-RTS frame and the second MU-RTS frame each may include a first bit sequence. The first bit sequence may indicate a bandwidth of the first data unit. Alternatively, the first MU-RTS frame may include a second bit sequence. The second bit sequence indicates a bandwidth of the second data unit. The second MU-RTS frame may include a third bit sequence. The third bit sequence may indicate a bandwidth of the third data unit.

Based on the foregoing solution, the AP may indicate, based on a bit sequence in the MU-RTS frame, a bandwidth of a PPDU that carries the MU-RTS frame, or may indicate, based on the bit sequence, bandwidths that carry a plurality of MU-RTS frames.

According to a fourth aspect, a request to send RTS frame transmission method is provided. The method may be performed by a first device provided in embodiments of this application. The first device may be an AP or a chip that implements a function similar to that of the AP. In the method, the first device may separately send an RTS frame on at least two channels. The first device may receive CTS frames with a same frame length on the at least two channels.

Based on the foregoing solution, the AP may indicate, to a plurality of STAs by using a plurality of RTS frames, channels for replying CTS frames, and frame lengths of a plurality of CTS frames received by the AP. In this way, data can be simultaneously sent to the plurality of STAs within SIFS time after the CTS ends. This avoids a case in which the channel is occupied by a third-party station due to channel idle time greater than an SIFS on a part of subchannels.

In a possible implementation, frame lengths of all RTS frames may be the same.

Based on the foregoing solution, the AP may control a frame length of each sent RTS frame, so that frame lengths of a plurality of RTS frames are the same, and sending duration may be aligned.

In a possible implementation, first transmit rates of all RTS frames may be the same. Alternatively, a first transmit rate of each RTS frame may be used to determine a same second transmit rate. The second transmit rate is a main rate at which a second device sends the CTS frame.

Based on the foregoing solution, the AP may control the main rate of the CTS frame by controlling the rate of the RTS frame, to control frame lengths of CTS frames sent by a plurality of STAs to be the same.

According to a fifth aspect, a clear to send CTS frame transmission method is provided. The method may be performed by a second device provided in embodiments of this application. The second device may be an SST STA or a chip that implements a function similar to that of the SST STA. In the method, the second device may receive an RTS frame. The second device sends a CTS frame at a second transmit rate. A value of the second transmit rate may be a fixed rate. Alternatively, the second device sends a CTS frame at a third transmit rate. A frame length of the CTS frame sent at the third transmit rate is the same as a frame length of the CTS frame sent at the fixed rate.

Based on the foregoing solution, a STA may send a CTS frame at a fixed rate. In this case, frame lengths of CTS frames sent by a plurality of STAs may be the same. Alternatively, the STA may send a CTS frame at a non-fixed rate, and a frame length of the CTS frame sent at the non-fixed rate may be the same as the frame length of the CTS frame sent at the fixed rate. Therefore, the frame lengths of the CTS frames sent by the plurality of STAs may be the same.

According to a sixth aspect, an apparatus having a communication function is provided. The apparatus may include modules/units configured to perform any one of the first aspect or the possible implementations of the first aspect, or may further include modules/units configured to perform any one of the second aspect or the possible implementations of the second aspect, or may further include modules/units configured to perform any one of the third aspect or the possible implementations of the third aspect, or may further include modules/units configured to perform any one of the fourth aspect or the possible implementations of the fourth aspect, or may further include modules/units configured to perform any one of the fifth aspect or the possible implementations of the fifth aspect, for example, a processing unit and a communication unit.

For example, when the apparatus is configured to perform any one of the first aspect or the possible implementations of the first aspect, the processing unit is configured to generate an MU-RTS frame. The MU-RTS frame may include indication information indicating a first channel. The first channel herein is a first channel on which a second device sends a CTS frame. The first channel includes a target channel of the second device. The target channel may be a 20 MHz subchannel in an operating channel of an SST STA. Alternatively, the target channel may be any 20 MHz subchannel other than a primary 20 MHz channel. The communication unit is configured to send the MU-RTS frame.

In a possible implementation, the indication information may include a first bit sequence. The first bit sequence indicates the first channel. Optionally, the indication information further includes a second bit sequence. A value of the second bit sequence is 1 or in a reserved state.

For example, when the apparatus is configured to perform any one of the second aspect or the possible implementations of the second aspect, the communication unit is configured to receive an MU-RTS frame. The MU-RTS frame may include indication information. The indication information herein may indicate a first channel. The first channel includes a target channel of the second device. The target channel may be a 20 MHz subchannel in an operating channel of an SST STA. Alternatively, the target channel may be any 20 MHz subchannel other than a primary 20 MHz channel. The processing unit is configured to generate a CTS frame. The communication unit is further configured to send a CTS frame on the first channel.

In a design, the indication information may include a first bit sequence. The first bit sequence indicates the first channel. Optionally, the indication information further includes a second bit sequence. A value of the second bit sequence is 1 or in a reserved state.

For example, when the apparatus is configured to perform any one of the third aspect or the possible implementations of the third aspect, the processing unit generates a first data unit. The first data unit includes at least a second data unit and a third data unit. The second data unit is used to carry a first multi-user request to send MU-RTS frame. The third data unit is used to carry a second MU-RTS frame. The first MU-RTS frame and the second MU-RTS frame use a same scrambling code initialization value. The communication unit is configured to send the first data unit.

In a design, the first MU-RTS frame indicates a first channel on which a second device sends a clear to send CTS frame. The second MU-RTS frame indicates a second channel on which a third device sends a CTS frame. When a bandwidth of the first channel partially or completely overlaps a bandwidth of the second channel, the first MU-RTS frame and the second MU-RTS frame use a same scrambling code initialization value.

In a design, the first data unit includes a plurality of data units. Each of the plurality of data units is used to carry an MU-RTS frame. Scrambling code initialization values of all MU-RTS frames are the same. The second data unit and the third data unit are two of the plurality of data units.

In a design, the first MU-RTS frame and the second MU-RTS frame each include a first bit sequence, and the first bit sequence indicates a bandwidth of the first data unit. Alternatively, the first MU-RTS frame includes a second bit sequence, and the second bit sequence indicates a bandwidth of the second data unit. The second MU-RTS frame includes a third bit sequence, and the third bit sequence indicates a bandwidth of the third data unit.

For example, when the apparatus is configured to perform any one of the fourth aspect or the possible implementations of the fourth aspect, the processing unit is configured to generate a plurality of request to send RTS frames. The communication unit is configured to separately send an RTS frame on at least two channels. The communication unit is further configured to receive clear to send CTS frames with a same frame length on the at least two channels.

In a design, frame lengths of all the RTS frames are the same.

In a design, first transmit rates of all the RTS frames are the same. Alternatively, a first transmit rate of each RTS frame is used to determine a same second transmit rate, and the second transmit rate is a main rate at which a second device sends the CTS frame.

For example, when the apparatus is configured to perform any one of the fifth aspect or the possible implementations of the fifth aspect, the communication unit is configured to receive a request to send RTS frame. The processing unit is configured to generate a clear to send CTS frame. The communication unit is further configured to send the clear to send CTS frame at a second transmit rate, and a value of the second transmit rate is a fixed rate. Alternatively, the communication unit is further configured to send the CTS frame at a third transmit rate. A frame length of the CTS frame sent at the third transmit rate is the same as a frame length of the CTS frame sent at the fixed rate.

According to a seventh aspect, an apparatus having a communication function is provided. The apparatus includes a processor and a transceiver. The processor performs operation steps of the method in any one of the first aspect or the possible implementations of the first aspect, or performs operation steps of the method in any one of the second aspect or the possible implementations of the second aspect, or performs operation steps of the method in any one of the third aspect or the possible implementations of the third aspect, or performs operation steps of the method in any one of the fourth aspect or the possible implementations of the fourth aspect, or performs operation steps of the method in any one of the fifth aspect or the possible implementations of the fifth aspect. The transceiver performs receiving and sending steps of the method in any one of the first aspect or the possible implementations of the first aspect, or performs receiving and sending steps of the method in any one of the second aspect or the possible implementations of the second aspect, or performs receiving and sending steps of the method in any one of the third aspect or the possible implementations of the third aspect, or performs receiving and sending steps of the method in any one of the fourth aspect or the possible implementations of the fourth aspect, or performs receiving and sending steps of the method in any one of the fifth aspect or the possible implementations of the fifth aspect.

In a design, the apparatus further includes a memory. The memory is configured to store computer-executable instructions. When a controller runs, the processor executes the computer-executable instructions in the memory to perform the methods in the foregoing aspects by using hardware resources in the controller. The memory may be located inside the apparatus, or may be located outside the apparatus and connected to the apparatus.

In a design, the memory and the processor may be integrated together.

According to a ninth aspect, a chip is provided, including a communication interface and a logic circuit. The communication interface is configured to input and output information. The logic circuit is configured to perform the methods in the foregoing aspects. For example, the logic circuit may output an MU-RTS frame through the communication interface.

According to a tenth aspect, this application provides a computer-readable storage medium. The computer-readable storage medium stores instructions, and when the instructions are run on a computer, the computer is enabled to perform the methods in the foregoing aspects.

According to an eleventh aspect, this application provides a computer program product including instructions. When the computer program product runs on a computer, the computer is enabled to perform the methods in the foregoing aspects.

In addition, for beneficial effects of the second aspect to the eleventh aspect, refer to the beneficial effects of the first aspect to the sixth aspect.

BRIEF DESCRIPTION OF DRAWINGS

FIG. 3 is a schematic diagram of a structure of a trigger frame according to an embodiment of this application;

FIG. 4 is a schematic diagram of user info of a trigger frame according to an embodiment of this application;

FIG. 8 is a schematic diagram of sending a plurality of MU-RTS frames by an AP according to an embodiment of this application;

DESCRIPTION OF EMBODIMENTS

Figure 1:
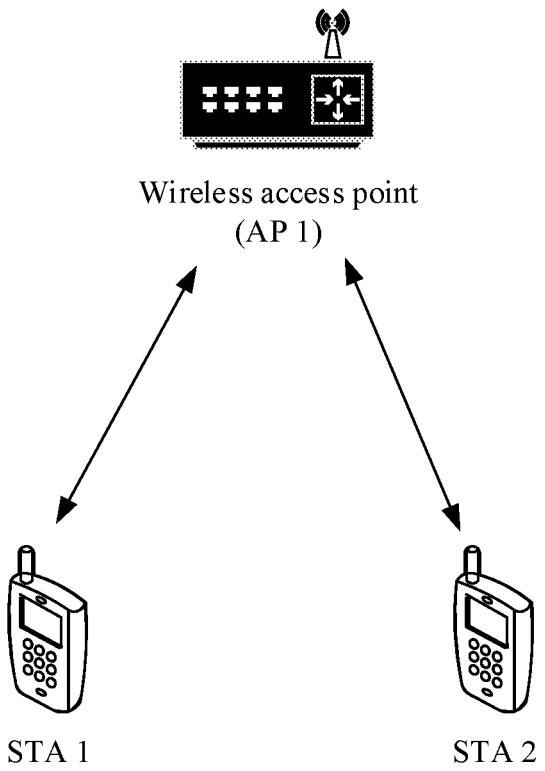
FIG. 1 is a schematic diagram of a communication system according to an embodiment of this application.

Currently, a basic framework commonly used in a wireless access standard is that an AP accesses the Internet and is associated with a plurality of stations. Uplink and downlink communication may be performed between the AP and the associated stations. A channel for communication between the AP and the plurality of associated stations may support a maximum bandwidth of 320 MHz, and each associated station may communicate with the AP on a specified channel.

Because a hidden node is common in a wireless local area network, a channel may be reserved for a STA in an RTS/CTS interaction manner. A principle of the RTS/CTS interaction manner is that when the AP intends to send a message to the STA, the AP may first send an RTS frame. After receiving the RTS frame, another AP and a STA around the AP may keep quiet. After receiving the RTS frame, the STA may send a CTS frame. After receiving the CTS frame, an AP and a STA around the STA may also keep quiet. After transmission opportunity (transmission opportunity, TXOP) duration indicated by a length (Duration) field in the RTS or CTS frame ends, the AP and the STA that keep quiet may restore communication, and receive and send messages.

To improve efficiency of channel protection, an MU-RTS/CTS interaction mechanism is introduced. A principle of the MU-RTS/CTS interaction mechanism is that an AP may send an MU-RTS frame in a broadcast manner. The MU-RTS frame carries identifiers of a plurality of STAs, and specifies, for each STA, information about a bandwidth for replying a CTS frame. After the MU-RTS frame ends, each receive station may send a CTS frame on the specified bandwidth.

It should be noted that a channel occupied by the CTS frame may be a primary 20 MHz channel, a primary 40 MHz channel, a primary 80 MHz channel, a primary 160 MHz channel, or a 320 MHz channel.

However, to make full use of a channel resource, an SST mechanism may be used to schedule a STA to a secondary channel, to send and receive data. Because an operating channel of the STA is a secondary channel, a channel cannot be reserved according to an RTS/CTS mechanism or an MU-RTS/CTS mechanism.

In addition, the MU-RTS frame and the RTS frame are sent in a non-HT duplicated manner. A format of a non-HT duplicated frame may include four parts: a legacy short training field (L-STF), a legacy long training field (leL-LTF), a legacy signal (L-SIG), and payload. The payload may include four parts: a service, a physical layer service data unit (scrambled physical layer service data unit, PSDU), a tail bit, and a pad bit.

For example, when sending the MU-RTS/RTS frame on an 80 MHz bandwidth channel, the AP may repeatedly send the MU-RTS/RTS frame on each 20 MHz subchannel. MU-RTS/RTS frames sent on all 20 MHz subchannels are the same. A manner in which the AP sends the MU-RTS/RTS frame on a 320 MHz bandwidth channel is similar to that in which the AP sends the MU-RTS/RTS frame on the 80 MHz bandwidth channel. The AP may send the MU-RTS/RTS frame on each 20 MHz bandwidth subchannel, but a quantity of repetitions is greater than a quantity of repetitions when the MU-RTS/RTS frame is sent on the 80 MHz bandwidth channel.

A design of an SST in the 802.11ax standard is simple. The AP sends downlink data to an SST STA or schedules the SST STA to send uplink data only when all operating channels of the SST STA are available. When some 20 MHz subchannels in the operating channel of the SST STA are unavailable, the AP cannot communicate with the SST STA. The SST STA cannot predict which 20 MHz subchannels are used to send data, and therefore frame parsing cannot be performed.

Based on the foregoing problem, an embodiment of this application provides an MU-RTS frame transmission method. In the method, an AP determines an anchor 20 MHz subchannel for an SST STA on an operating channel. When the anchor 20 MHz subchannel is unavailable, the AP does not perform uplink or downlink communication with the SST STA. When the anchor 20 MHz subchannel is available, but some or all other 20 MHz subchannels in the operating channel are unavailable, the AP may perform uplink or downlink communication with the SST STA by using an RU including the anchor 20 MHz subchannel.

Embodiments of this application may be applied to a wireless local area network (WLAN) scenario, and may be applied to an IEEE 802.11 system standard, for example, the 802.11a/b/g standard, the 802.11n standard, the 802.11ac standard, 802.11ax standard, or the next generation standard, for example, the 802.11be standard, or a subsequent standard of the next generation standard.

The WLAN system can provide high-speed and low-latency transmission. With continuous evolution of WLAN application scenarios, the WLAN system is to be applied to more scenarios or industries, for example, the Internet of Things industry, the Internet of Vehicles industry, the banking industry, enterprise offices, exhibition halls of stadiums, concert halls, hotel rooms, dormitories, wards, classrooms, supermarkets, squares, streets, production workshops and warehousing. Certainly, a device (such as an access point or a station) that supports WLAN communication may be a sensor node (for example, a smart water meter, a smart electricity meter, or a smart air detection node) in a smart city, a smart device (for example, a smart camera, a projector, a display, a television, a stereo, a refrigerator, or a washing machine) in a smart home, a node in the Internet of Things, an entertainment terminal (for example, an AR, a VR, or another wearable device), a smart device in smart office (for example, a printer, a projector, a loudspeaker, or a stereo), an Internet of Vehicles device in the Internet of Vehicles, an infrastructure (for example, a vending machine, a self-service navigation station of a supermarket, a self-service cash register device, or a self-service ordering machine) in daily life scenarios, a device in a large sports and music venue, and the like. Specific forms of the STA and the AP are not limited in embodiments of this application, and are merely examples for description herein.

Alternatively, embodiments of this application may be applied to a wireless local area network system, for example, an Internet of Things (IoT) or a vehicle-to-everything (Vehicle to X, V2X) network. Certainly, embodiments of this application may be further applied to another possible communication system, for example, a long term evolution (LTE) system, an LTE frequency division duplex (FDD) system, LTE time division duplex (TDD), a universal mobile telecommunication system (UMTS), a worldwide interoperability for microwave access (WiMAX) communication system, and a future 5G communication system.

In an example, the communication system shown in FIG. 1 is used as an example to describe in detail a communication system applicable to embodiments of this application. FIG. 1 is a schematic diagram of a communication system applicable to a method according to an embodiment of this application. As shown in FIG. 1, the communication system 100 includes an AP 1 and a plurality of STAs associated with the AP 1. The plurality of STAs associated with the AP 1 are respectively a STA 101 and a STA 102. The AP may schedule a radio resource for a STA associated with the AP and/or a STA not associated with the AP, and transmit data to the STA on the scheduled radio resource. For example, the AP 1 may schedule a radio resource for a STA 1 and a STA 2, and transmit data, including uplink data information and/or downlink data information, for the STA 1 and the STA 2 on the scheduled radio resource. The AP and the STA in this embodiment of this application may be wireless communication devices that support parallel transmission on a plurality of links. It should be understood that quantities of APs and STAs in FIG. 1 are merely an example. There may be more or less APs and STAs.

The STA in embodiments of this application is an apparatus having a wireless communication function, supports communication based on the WLAN protocol, and has a capability of communicating with another station or the access point in the WLAN network. In the WLAN system, a station may be referred to as a non-access point station (non-access point station, non-AP STA). For example, the STA is any user communication device that allows a user to communicate with an AP and further communicate with a WLAN. The apparatus having a wireless communication function may be an entire device, or may be a chip or a processing system installed in the entire device. The device in which the chip or the processing system is installed may implement the method and the function in embodiments of this application under control of the chip or the processing system. For example, the STA may be user equipment that can connect to the Internet, for example, a tablet computer, a desktop computer, a laptop computer, a notebook computer, an ultra-mobile personal computer (UMPC), a handheld computer, a netbook, a personal digital assistant (PDA), or a mobile phone. Alternatively, the STA may be an Internet of Things node in the Internet of Things, an in-vehicle communication apparatus in the Internet of Vehicles, an entertainment device, a game device or system, a global positioning system device, or the like. The STA may alternatively be a chip and a processing system in the foregoing terminals.

The AP in embodiments of this application is an apparatus having a wireless communication function, supports communication based on a WLAN protocol, and has a function of communicating with another device (for example, a station or another access point) in a WLAN network. Certainly, the AP may further have a function of communicating with another device. In a WLAN system, an access point may be referred to as an access point station (AP STA). The apparatus having the wireless communication function may be an entire device, or may be a chip or a processing system installed in the entire device. The device in which the chip or the processing system is installed may implement the method and the function in embodiments of this application under control of the chip or the processing system. The AP in embodiments of this application is an apparatus providing a service for a STA, and may support 802.11 series protocols. For example, the AP may be a communication entity, for example, a communication server, a router, a switch, or a bridge. The AP may include a macro base station, a micro base station, a relay station, and the like in various forms. Certainly, the AP may alternatively be a chip or a processing system in these devices in various forms, to implement the method and the function in embodiments of this application.

To make full use of a channel resource, the AP 1 may schedule the STA 102 to operate on a secondary channel. A principle thereof is that the AP 1 may schedule the STA 102 to receive downlink data or send uplink data on a specified secondary channel within TWT. The STA 102 may be referred to as an SST STA. The following describes an operating channel of the SST STA with reference to FIG. 2.

Figure 2:
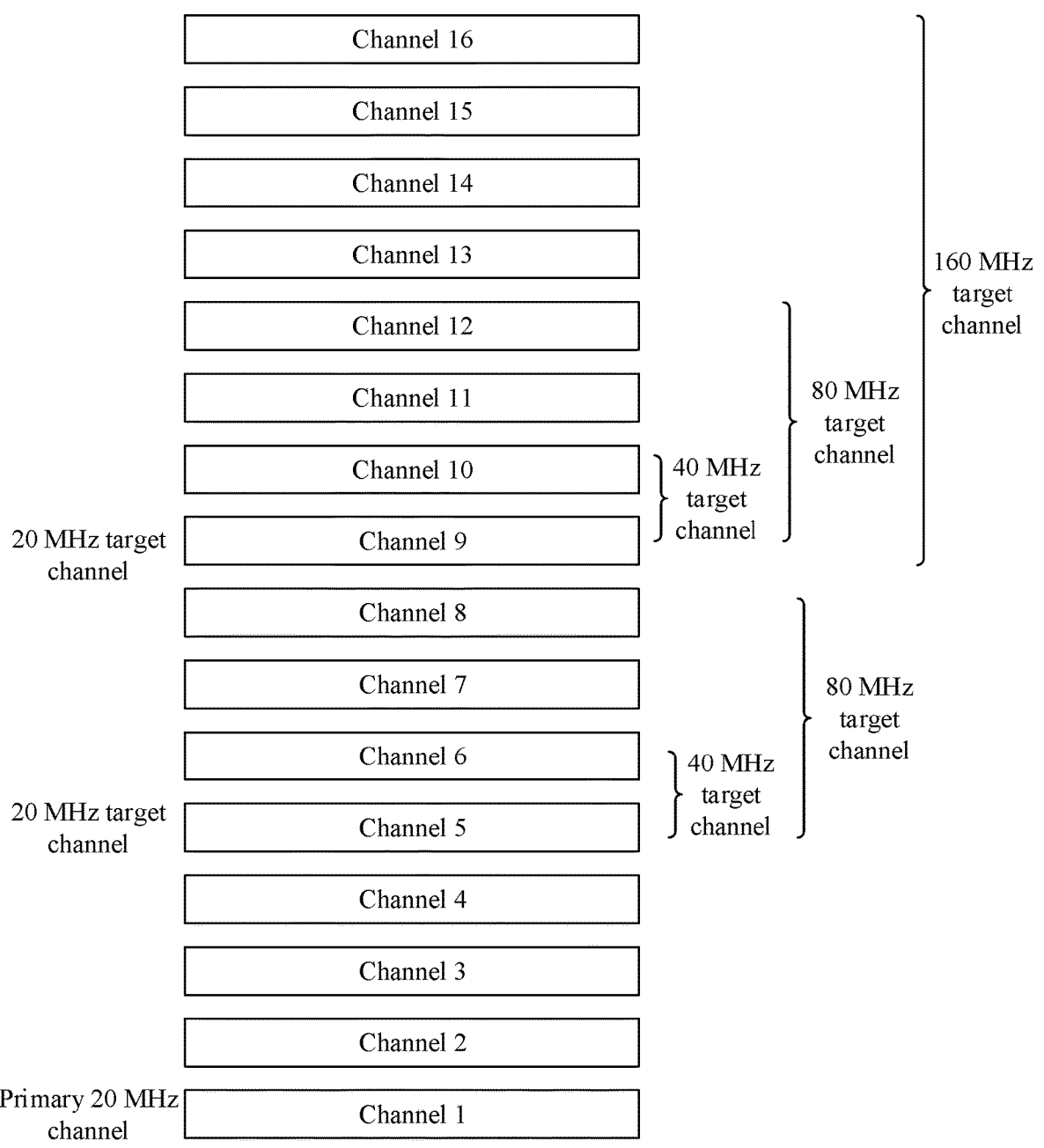
FIG. 2 is a schematic diagram of a target channel according to an embodiment of this application.

As shown in FIG. 2, a primary 20 MHz channel may be a channel 1. In this case, a 40 MHz channel including the primary 20 MHz channel may be referred to as a primary 40 MHz channel, an 80 MHz channel including the primary 20 MHz channel may be referred to as a primary 80 MHz channel, and a 160 MHz channel including the primary 20 MHz channel may be referred to as a primary 160 MHz channel. However, the operating channel of the SST STA may not include the primary 20 MHz channel. Therefore, the operating channel of the SST STA does not include the primary 20 MHz channel, the primary 40 MHz channel, the primary 80 MHz channel, or the primary 160 MHz channel. Currently, a channel for communication between the AP and the STA may support a maximum bandwidth of 320 MHz. Therefore, the operating channel of the SST STA is further described by using the bandwidth of 320 MHz as an example.

For example, the AP 1 schedules the STA 102 to operate on a secondary 80 MHz channel. The secondary 80 MHz channel may be any one of a channel 5 to a channel 8, a channel 9 to a channel 12, and a channel 13 to a channel 16. A target channel (anchor channel) may be determined for the STA 102. It is assumed that the STA 102 is scheduled to operate on the channel 5 to the channel 8 whose bandwidths are 80 MHz. In this case, the target channel of the STA 102 may be any one of the channel 5 to the channel 8 (the channel 5 shown in FIG. 2). The target channel may be referred to as an anchor 20 MHz channel, a 40 MHz channel (for example, the channel 5 to the channel 6) including the anchor 20 MHz channel may be referred to as an anchor 40 MHz channel, and an 80 MHz channel (for example, the channel 5 to the channel 8) including the anchor 20 MHz channel may be referred to as an anchor 80 MHz channel. The target channel may also be referred to as a name such as a temporary primary 20 MHz channel or a negotiated 20 MHz channel, which is different from the primary 20 MHz channel. The name of the target channel is not limited in this application.

For another example, the AP 1 schedules the STA 101 to operate on a secondary 160 MHz channel. Because the channel for communication between the AP and the STA may support the maximum bandwidth of 320 MHz, a secondary channel whose bandwidth is 160 MHz may be a 160 MHz channel (the channel 9 to the channel 16 shown in FIG. 2) that does not include the primary 20 MHz channel. An anchor channel may be determined for the STA 101. The target channel may be referred to as an anchor 20 MHz channel, a 40 MHz channel (for example, the channel 9 to the channel 10) including the anchor 20 MHz channel may be referred to as an anchor 40 MHz channel, an 80 MHz channel (for example, the channel 9 to the channel 12) including the anchor 20 MHz channel may be referred to as an anchor 80 MHz channel, and a 160 MHz channel (for example, the channel 9 to the channel 16) including the anchor 20 MHz channel may be referred to as an anchor 160 MHz channel.

It should be noted that the anchor 20 MHz channels of the STA 101 and the STA 102 may be indicated by the AP, or may be determined by the AP and the STA through negotiation. This is not specifically limited in this application. The anchor channel in this embodiment of this application may be another 20 MHz channel other than a primary channel. The primary 20 MHz channel and the anchor 20 MHz channel shown in FIG. 2 are merely examples. The primary 20 MHz channel or the anchor 20 MHz channel may alternatively be any one of the channel 1 to the channel 16.

In this embodiment of this application, based on the anchor 20 MHz channel, when the AP schedules the STA to operate on a secondary channel, a channel may be reserved for the SST STA according to an MU-RTS/CTS mechanism or an RTS/CTS mechanism. The following first describes a structure of an MU-RTS frame with reference to FIG. 3 to FIG. 4.

As shown in FIG. 3, the MU-RTS is a trigger frame, and the trigger frame may include one or more user information (user info) fields. The user info field may be shown in FIG. 4. An association identifier (AID) 12 identifies a target STA, and a resource unit allocation (RU Allocation) field may be used to allocate, to the target STA, a channel for sending a CTS frame. The RU allocation field may include bit sequences B0 to B7. Therefore, the AP may allocate, to the SST STA by using the RU allocation field in the MU-RTS frame, the channel for sending the CTS frame.

Figure 5:
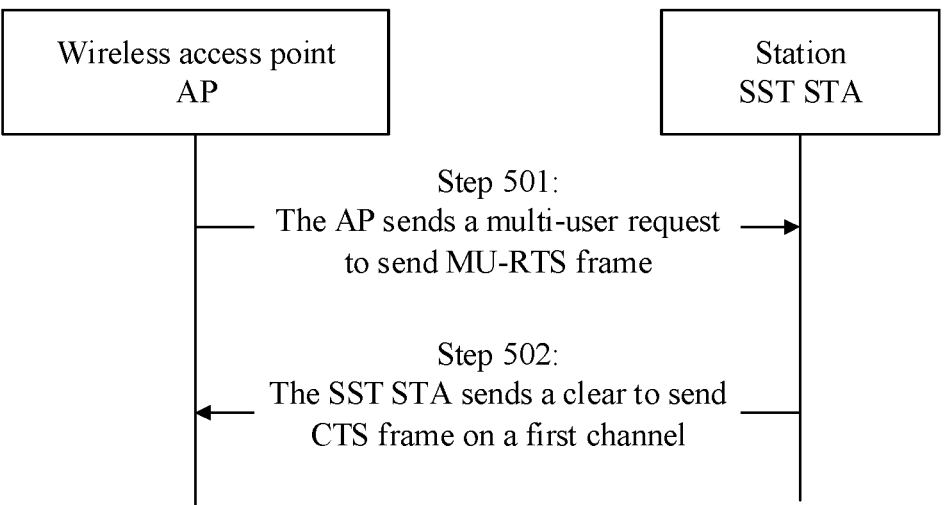
FIG. 5 is an example flowchart of an MU-RTS frame and CTS frame transmission method according to an embodiment of this application.

FIG. 5 is an example flowchart of the MU-RTS frame transmission method according to an embodiment of this application. The method may include the following steps.

Step 501: An AP sends an MU-RTS frame.

The MU-RTS frame herein may include indication information. The indication information may indicate a first channel on which a CTS frame is sent. The first channel herein may be indicated based on an anchor 20 MHz channel of the SST STA.

It should be noted that the indication information may include the bit sequences B0 to B7. B1 to B7 may be referred to as first bit sequences, and indicate the first channel on which the CTS frame is sent. B0 may be referred to as a second bit sequence, and may indicate an operating channel of the SST STA. It should be understood that, because the SST STA can learn of the operating channel of the SST STA, a value of B0 may be 1, or may be in a reserved state.

The following separately describes cases in which different first channels are indicated based on values of B1 to B7.

As shown in FIG. 2, an 80 MHz bandwidth channel may be referred to as a channel segment. As shown in FIG. 2, four channel segments may be included. The channel 1 to the channel 4 are one channel segment, the channel 5 to the channel 8 are one channel segment, the channel 9 to the channel 12 are one channel segment, and the channel 13 to the channel 16 are one channel segment. In this embodiment of this application, values of B1 to B7 may be set based on a frequency location of the anchor channel in the channel segment in which the SST STA is located.

For an SST STA operating on an 80 MHz bandwidth, an operating channel of the SST STA may be any channel segment other than the channel 1 to the channel 4 in the foregoing four channel segments. For a STA operating on a 160 MHz bandwidth, an operating channel of the STA can only be two channel segments: the channel 9 to the channel 12 and the channel 13 to the channel 16 shown in FIG. 2. The following provides detailed descriptions.

Case 1: The first channel is an anchor 20 MHz channel.

Figure 6:
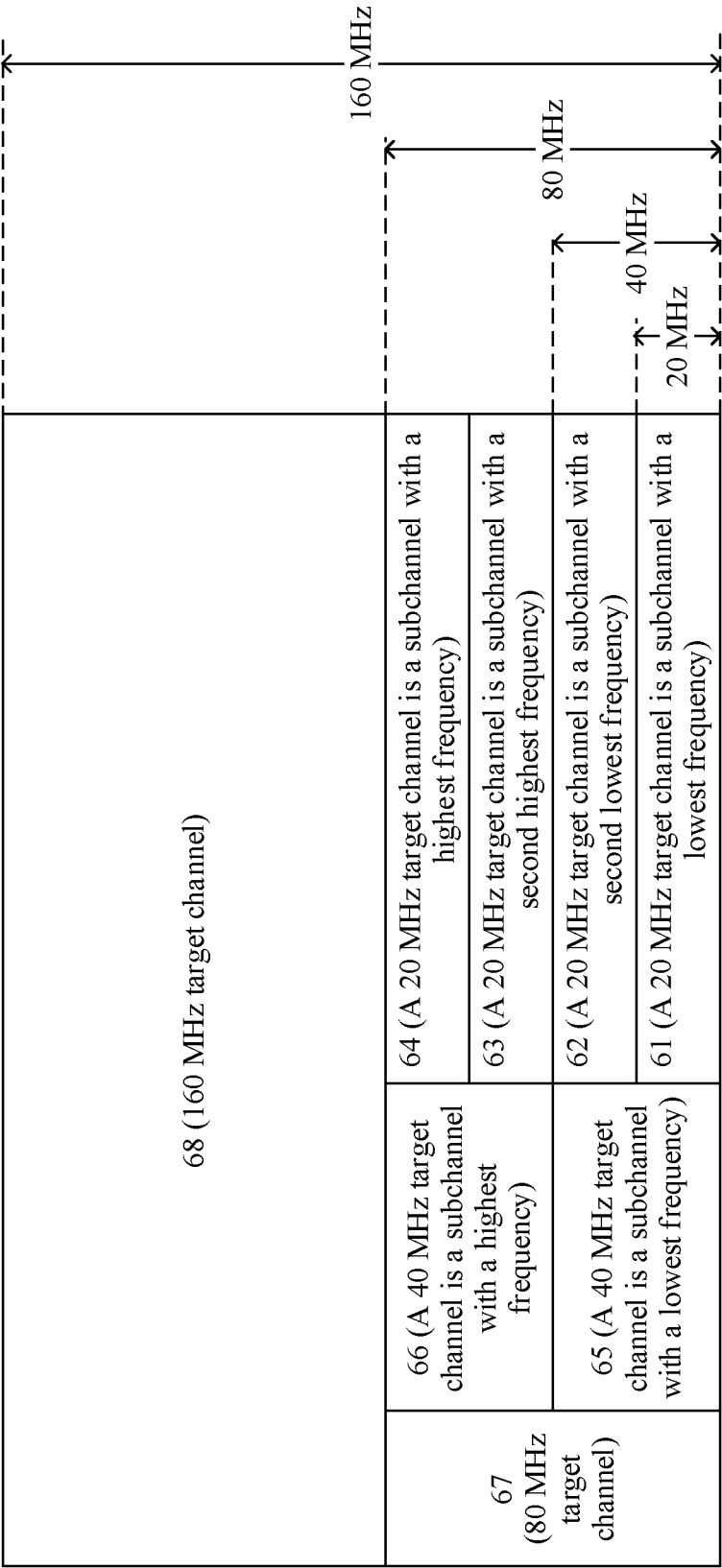
FIG. 6 is a schematic diagram of indication information and a target channel according to an embodiment of this application.

As shown in FIG. 6, if the anchor 20 MHz channel is a subchannel with a lowest frequency in the channel segment, the AP may set the values of B1 to B7 to a first value. If the anchor 20 MHz channel is a subchannel with a second lowest frequency in the channel segment, the AP may set the values of B1 to B7 to a second value. If the anchor 20 MHz channel is a subchannel whose frequency is the third in ascending order of frequencies in the channel segment, the AP may set the values of B1 to B7 to a third value. If the anchor 20 MHz channel is a subchannel whose frequency is the fourth in ascending order of frequencies in the channel segment, the AP may set the values of B1 to B7 to a fourth value.

Alternatively, if the anchor 20 MHz channel is a subchannel whose frequency is the fourth in descending order of frequencies in the channel segment, the AP may set the values of B1 to B7 to a first value. If the anchor 20 MHz channel is a subchannel whose frequency is the third in descending order of frequencies in the channel segment, the AP may set the values of B1 to B7 to a second value. If the anchor 20 MHz channel is a subchannel with a second highest frequency in the channel segment, the AP may set the values of B1 to B7 to a third value. If the anchor 20 MHz channel is a subchannel with a highest frequency in the channel segment, the AP may set the values of B1 to B7 to a fourth value.

It should be understood that the first value, the second value, the third value, and the fourth value may be predetermined, or may be specified in a communication protocol. This is not limited in this application.

For example, the first value may be 61, the second value may be 62, the third value may be 63, and the fourth value may be 64.

In addition, it should be noted that if an SST STA is scheduled to operate on a 20 MHz bandwidth channel, an anchor 20 MHz channel of the STA may be an operating channel of the SST STA. For an SST STA operating on an anchor 20 MHz channel, the values of B1 to B7 received by the SST STA may be only one of the first value to the fourth value.

For example, if the AP schedules an SST STA to operate on the channel 8 shown in FIG. 2, the SST STA can send a CTS frame only on the channel 8. An anchor 20 MHz channel of the STA is a channel with a highest frequency in the channel 5 to the channel 8. Therefore, when the AP sends an MU-RTS frame to the SST STA, the values of B1 to B7 may be only the fourth value, for example, 64.

In view of this, if the SST STA is a STA operating on a channel whose bandwidth is 20 MHz, the AP may set the values of B1 to B7 to a fixed value. For example, the AP may set the values to 0, or may set the values to 1, or may set the values to 61. Optionally, the AP may alternatively set the values of B1 to B7 in a reserved state.

Case 2: The first channel is an anchor 40 MHz channel.

As shown in FIG. 6, if the anchor 40 MHz channel is a subchannel with a lowest frequency in the channel segment, the AP may set the values of B1 to B7 to a fifth value. If the anchor 40 MHz channel is a subchannel with a second lowest frequency in the channel segment, the AP may set the values of B1 to B7 to a sixth value.

Alternatively, if the anchor 40 MHz channel is a subchannel with a second highest frequency in the channel segment, the AP may set the values of B1 to B7 to a fifth value. If the anchor 40 MHz channel is a subchannel with a highest frequency in the channel segment, the AP may set the values of B1 to B7 to a sixth value.

The fifth value may be 65, and the sixth value may be 66. The fifth value and the sixth value may be predetermined, or may be specified in a communication protocol.

For example, if the AP schedules an SST STA to operate on the channel 5 to the channel 8 shown in FIG. 2, An anchor 20 MHz channel of the SST STA may be the channel 8 with a highest frequency in the channel 5 to the channel 8. If the AP intends to enable the SST STA to send a CTS frame on a channel whose bandwidth is 20 MHz, the AP may indicate the SST STA to send the CTS frame on the channel 8. If the AP intends to enable the SST STA to send a CTS frame on a channel whose bandwidth is 40 MHz, the AP may indicate the SST STA to send the CTS frame on the channel 7 and the channel 8.

Case 3: The first channel is an anchor 80 MHz channel.

As shown in FIG. 6, if the first channel is the anchor 80 MHz channel, the AP may set the values of B1 to B7 to a seventh value. The seventh value may be 67. The seventh value may be predetermined, or may be specified in a communication protocol.

For example, if the AP schedules an SST STA to operate on the channel 5 to the channel 8 shown in FIG. 2, an anchor 20 MHz channel of the SST STA may be the channel 5 with a lowest frequency in the channel 5 to the channel 8. If the AP intends to enable the SST STA to send a CTS frame on a channel whose bandwidth is 20 MHz, the AP may indicate the SST STA to send the CTS frame on the channel 5. If the AP intends to enable the SST STA to send a CTS frame on a channel whose bandwidth is 40 MHz, the AP may indicate the SST STA to send the CTS frame on the channel 5 and the channel 6. If the AP intends to enable the SST STA to send a CTS frame on a channel whose bandwidth is 80 MHz, the AP may indicate the SST STA to send the CTS frame on the channel 5 to the channel 8.

In other words, the AP may set the values of B1 to B7 to one of a first value, a fifth value, and the seventh value.

Case 4: The first channel is an anchor 160 MHz channel.

As shown in FIG. 6, if the first channel is the anchor 160 MHz channel, the AP may set the values of B1 to B7 to an eighth value. The eighth value may be 68. The eighth value may be predetermined based on an empirical value, or may be specified in a communication protocol.

For example, if the AP schedules an SST STA to operate on the channel 9 to the channel 16 shown in FIG. 2, an anchor 20 MHz channel of the SST STA may be the channel 9 in the channel 9 to the channel 16. If the AP intends to enable the SST STA to send a CTS frame on a channel whose bandwidth is 20 MHz, the AP may indicate the SST STA to send the CTS frame on the channel 9. If the AP intends to enable the SST STA to send a CTS frame on a channel whose bandwidth is 40 MHz, the AP may indicate the SST STA to send the CTS frame on the channel 9 and the channel 10. If the AP intends to enable the SST STA to send a CTS frame on a channel whose bandwidth is 80 MHz, the AP may indicate the SST STA to send the CTS frame on the channel 9 to the channel 12. If the AP intends to enable the SST STA to send a CTS frame on a channel whose bandwidth is 160 MHz, the AP may indicate the SST STA to send the CTS frame on the channel 9 to the channel 16.

Because the channel 9 is a channel with a lowest frequency in the channel segment, the AP may set the values of B1 to B7 to one of a first value, a fifth value, a seventh value, and the eighth value.

Based on Case 1 to Case 4, it may be determined that the first channel indicated by the AP needs to include the anchor 20 MHz channel of the SST STA. Case 1 to Case 4 describe a method for indicating, by the AP based on B1 to B7, the first channel on which the SST STA sends the CTS frame. In this embodiment of this application, the AP may also indicate, based on B1 to B7, a resource unit (resource unit, RU) on which the SST STA sends the CTS frame. The following describes a method for indicating, by the AP, the RU on which the SST STA sends the CTS frame.

If the AP intends to enable the SST STA to send the CTS frame on a 242-tone RU (indicating 26 subcarriers), the AP may set the values of B1 to B7 to one of a ninth value to a twelfth value. The ninth value to the twelfth value may be the same as the first value to the fourth value. For example, the ninth value may be 61, a tenth value may be 62, an eleventh value may be 63, and the twelfth value may be 64. Alternatively, the ninth value to the twelfth value may be different from the first value to the fourth value. It should be noted that when the SST STA sends the CTS frame on the 242-tone RU, the RU includes the anchor 20 MHz channel of the SST STA.

If the AP intends to enable the SST STA to send the CTS frame on a 484-tone RU, the AP may set the values of B1 to B7 to one of a thirteenth value and a fourteenth value. The thirteenth value and the fourteenth value may be the same as the fifth value and the sixth value. For example, the thirteenth value may be 65, and the fourteenth value may be 66. Alternatively, the thirteenth value and the fourteenth value may be different from the foregoing fifth value and sixth value. It should be noted that when the SST STA sends the CTS frame on the 484-tone RU, the RU includes the anchor 20 MHz channel of the SST STA.

If the AP intends to enable the SST STA to send the CTS frame on a 996-tone RU, the AP may set the values of B1 to B7 to a fifteenth value. The fifteenth value may be the same as the foregoing value. For example, the fifteenth value may be 67. Alternatively, the fifteenth value may be different from the seventh value. It should be noted that when the SST STA sends the CTS frame on the 996-tone RU, the RU includes the anchor 20 MHz channel of the SST STA.

If the AP intends to enable the SST STA to send the CTS frame on a 2*996-tone RU, the AP may set the values of B1 to B7 to a sixteenth value. The sixteenth value may be the same as the eighth value. For example, the sixteenth value may be 68. Alternatively, the sixteenth value may be different from the eighth value. It should be noted that when the SST STA sends the CTS frame on the 2*996-tone RU, the RU includes the anchor 20 MHz channel of the SST STA.

For example, refer to in FIG. 2. The anchor 20 MHz channel of the SST STA is the channel 5, and the operating channel of the SST STA is the channel 5 to the channel 8. If the AP intends to enable the SST STA to send the CTS frame on the 242-tone RU, the AP may set the values of B1 to B7 to the ninth value or the first value. If the AP intends to enable the SST STA to send the CTS frame on the 484-tone RU, the AP may set the values of B1 to B7 to the thirteenth value or the fifth value. If the AP intends to enable the SST STA to send the CTS frame on the 996-tone RU, the AP may set the values of B1 to B7 to the fifteenth value or the seventh value.

Based on the foregoing solution, the AP may indicate, to the SST STA based on B1 to B7, the channel for replying the CTS frame, so that the SST STA may also reserve the channel according to an MU-RTS/CTS mechanism. This can avoid a case in which the channel is preempted by a third-party station, and can reduce interference during data receiving and sending.

In a possible implementation, the AP indicates an anchor 20 MHz channel to the SST STA. When information or data is sent to the SST STA, a channel for sending the information or data may include the anchor 20 MHz channel, to prevent the SST STA from missing a frame sent to the SST STA. Based on the foregoing solution, the AP may support sending of an MU-RTS/RTS frame in a preamble puncture manner.

Figure 7:
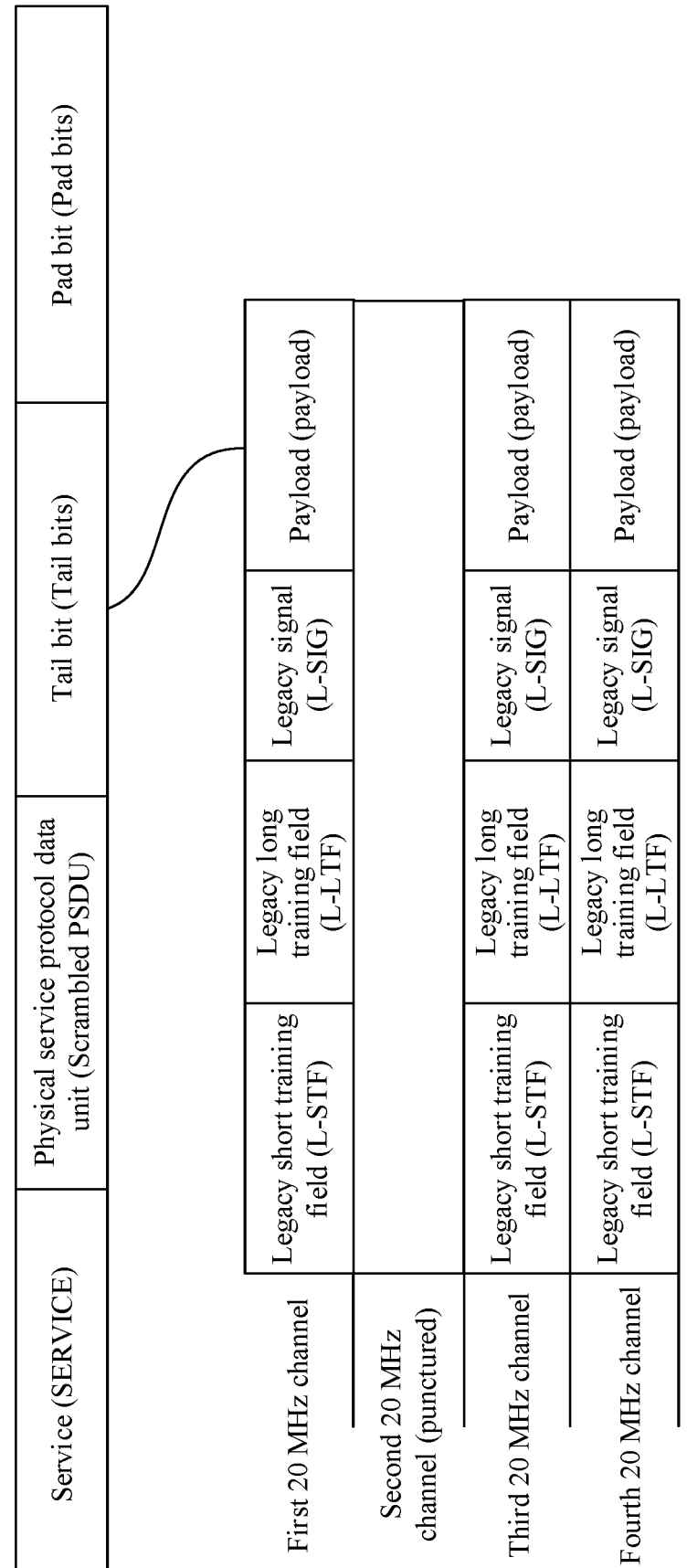
FIG. 7 is a schematic diagram of sending an MU-RTS frame by an AP during puncture according to an embodiment of this application.

As shown in FIG. 7, a second 20 MHz bandwidth subchannel is punctured. When the AP intends to schedule the SST STA to receive and send information or data, the AP may repeatedly send MU-RTS/RTS frames on a plurality of 20 MHz subchannels that are not punctured, and send no information on the punctured subchannel. It should be noted that, for an SST STA whose anchor 20 MHz channel is the second 20 MHz bandwidth subchannel, the AP does not schedule the SST STA to receive or send data.

Based on the foregoing solution, when some subchannels in the operating channel of the SST STA are unavailable, the AP may communicate with the SST STA, and the SST STA may also receive, on the anchor 20 MHz channel, information sent by the AP, to implement information transmission with the AP.

In another possible implementation, the AP may send a plurality of MU-RTS frames. At least one of the plurality of MU-RTS frames indicates a channel on which the SST STA sends a CTS frame. When the AP sends the plurality of MU-RTS frames, the MU-RTS frames may be sent on different channels. Compared with a manner of indicating, to a plurality of STAs by using one MU-RTS frame, channels for sending CTS frames, in a manner of respectively indicating, to the plurality of STAs by using the plurality of MU-RTS frames, the channels for sending the CTS frames, indication information for indicating, to the plurality of STAs, the channels for sending the CTS frames may be dispersed in different MU-RTS frames. This can reduce a length of the MU-RTS frame. In this way, signaling overheads are reduced, and a probability of contention of a hidden node during the MU-RTS frame can also be reduced. Because there may be four 80 MHz channel segments within a 320 MHz channel, when a different MU-RTS is sent on each 80 MHz channel segment on the 320 MHz channel, only a quarter of stations may need to be scheduled in each MU-RTS frame.

A possible reason why the AP sends a plurality of MU-RTS frames is that the station includes a high efficiency station (HE STA), and the HE STA does not support the 320 MHz channel. Therefore, when the AP sends one MU-RTS frame on the 320 MHz bandwidth channel, the HE station cannot be scheduled. In this case, the AP may send one MU-RTS frame on the primary 160 MHz channel to schedule the HE STA and an extremely high throughput station (EHT STA), and send another MU-RTS frame on a secondary 160 MHz channel to schedule an EHT SST STA.

Scrambling code initialization values of some or all of the plurality of MU-RTS frames sent by the AP may be the same. A scrambling code initialization field is the first seven bits (B0 to B6) of a service field. The scrambling code initialization value at a transmit end is a value of a scrambling code initialization field after a scrambling operation, and the scrambling code initialization value at a receive end is a value of a scrambling code initialization field before a descrambling operation. Because the scrambling code initialization value is obtained after bits whose initial states are all 0 are scrambled based on a specific scrambler seed, a same scrambling code initialization value is also considered as a same scrambler seed. Therefore, in this solution, using a same scrambling code initialization value may be replaced with using a same scrambler seed or a same scrambling code initialization sequence, and technical effect of the two is the same.

For example, the AP sends an MU-RTS frame 1, an MU-RTS frame 2, an MU-RTS frame 3, and an MU-RTS frame 4. Scrambling code initialization values of the MU-RTS frame 1, the MU-RTS frame 2, the MU-RTS frame 3, and the MU-RTS frame 4 may all be the same.

In an example, the MU-RTS frame 1 indicates that a channel on which the STA sends a CTS frame is the channel 5 to the channel 6. The MU-RTS frame 2 indicates that a channel on which the STA sends a CTS frame is the channel 5 to the channel 8. The MU-RTS frame 3 indicates that a channel on which the STA sends a CTS frame is the channel 9 to the channel 10. The MU-RTS frame 4 indicates that a channel on which the STA sends a CTS frame is the channel 11 and the channel 12. Some bandwidths of the channels indicated by the MU-RTS frame 1 and the MU-RTS frame 2 overlap. Therefore, the MU-RTS frame 1 and the MU-RTS frame 2 may use a same scrambling code initialization value. A scrambling code initialization value used by the MU-RTS frame 3 may be the same as or different from that used by the MU-RTS frame 1 and that used by the MU-RTS frame 2. A scrambling code initialization value used by the MU-RTS frame 4 may be the same as or different from that used by the MU-RTS frame 1 and that used by the MU-RTS frame 2, and the scrambling code initialization value used by the MU-RTS frame 4 may be the same as or different from that used by the MU-RTS frame 3.

For example, refer to FIG. 8. The AP may send the MU-RTS 1 to a STA 1 on the channel 1 to the channel 4, and send the MU-RTS 2 to a STA 2 on the channel 5 to the channel 8. The MU-RTS 1 indicates a channel on which the STA 1 sends a CTS frame. The MU-RTS 2 indicates a channel on which the SST STA 2 sends a CTS frame.

In an example, the channel 1 may be a primary 20 MHz channel. It is assumed that the MU-RTS 1 indicates the STA 1 to send the CTS frame on the channel 5 to the channel 8, and the MU-RTS 2 indicates the STA 2 to send the CTS frame on the channel 1 to the channel 8. The STA 1 may be an SST STA. Bandwidths of channels on which the STA 1 and the STA 2 send the CTS frames partially overlap. Therefore, the CTS frame sent by the STA 1 and the CTS frame sent by the STA 2 should be completely the same, to avoid a conflict. Because a scrambling code initialization value of the CTS frame is the same as a scrambling code initialization value of a corresponding MU-RTS frame, the MU-RTS 1 and the MU-RTS 2 need to use a same scrambling code initialization value.

In another example, the channel 9 may be a primary channel (not shown in the figure). It is assumed that the MU-RTS 1 indicates the STA 1 to send the CTS frame on the channel 5 to the channel 8, and the MU-RTS 2 indicates the STA 2 to send the CTS frame on the channel 1 to the channel 8. Both the STA 1 and the STA 2 are SST STAs. Bandwidths of channels on which the STA 1 and the STA 2 send the CTS frames partially overlap. Therefore, the CTS frame sent by the STA 1 and the CTS frame sent by the STA 2 should be completely the same, to avoid a conflict. Because a scrambling code initialization value of the CTS frame is the same as a scrambling code initialization value of a corresponding MU-RTS frame, the MU-RTS 1 and the MU-RTS 2 need to use a same scrambling code initialization value.

Based on the foregoing solution, if indicated channels for sending the CTS frames overlap in a plurality of MU-RTS frames, MU-RTS frames that indicate these channels for sending the CTS frames may use a same scrambling code initialization value. This can reduce a problem of a conflict between the CTS frames. The AP may accurately receive a plurality of CTS frames.

Optionally, when the AP sends a plurality of MU-RTS frames, all the MU-RTS frames may use a same scrambling code initialization value. For example, the AP sends the MU-RTS 1 on the channel 1 to the channel 4, sends the MU-RTS 2 on the channel 5 to the channel 8, and sends the MU-RTS 3 on the channel 9 to the channel 16. Scrambling code initialization values of the MU-RTS 1, the MU-RTS 2, and the MU-RTS 3 may all be the same.

Based on the foregoing solution, the AP may enable a plurality of MU-RTS frames to all use a same scrambling code initialization value. This can reduce a problem of a conflict between the CTS frames, and can also reduce computing resources of the AP.

In this embodiment of this application, the MU-RTS frame may include a scrambler sequence field. The AP may indicate, by using some bits in the scrambler sequence field, for example, B5 and B6 bits, a bandwidth of a PPDU that carries the MU-RTS frame. For example, a PPDU 1 carries the MU-RTS 1, and a PPDU 2 carries the MU-RTS 2. The AP may set B5 and B6 bits in a scrambler sequence field of the MU-RTS 1 to a bandwidth of the PPDU 1, or may set B5 and B6 bits in a scrambler sequence field of the MU-RTS 2 to a bandwidth of the PPDU 2. Optionally, the AP may aggregate the PPDU 1 that carries the MU-RTS 1 and the PPDU 2 that carries the MU-RTS 2 into one PPDU, for example, a PPDU 3. It should be noted that the AP may carry the MU-RTS in the PPDU, and the AP may send a plurality of PPDUs to send a plurality of MU-RTSs. Alternatively, the AP may send one PPDU. The PPDU may include a plurality of PPDUs that carry the MU-RTSs. The PPDU may be formed by aggregating the plurality of PPDUs that carry the MU-RTSs.

In addition, it should be noted that, if the bandwidth of the PPDU 1 that carries the MU-RTS 1 is different from the bandwidth of the PPDU 2 that carries the MU-RTS 2, the scrambler sequence field of the MU-RTS 1 is different from the scrambler sequence field of the MU-RTS 2. Therefore, the scrambling code initialization values of the MU-RTS 1 and the MU-RTS 2 are different.

Therefore, if the MU-RTS 1 and the MU-RTS 2 need to use a same scrambling code initialization value, some bits in a scrambler sequence field of at least one MU-RTS frame of the MU-RTS 1 and the MU-RTS 2 do not indicate a bandwidth of a PPDU that carries the MU-RTS frame. For example, if the B5 and B6 bits in the scrambler sequence field of the MU-RTS 1 may indicate the bandwidth of the PPDU 1, the B5 and B6 bits in the scrambler sequence field of the MU-RTS 2 may be the same as the B5 and B6 bits of the MU-RTS 1, but do not indicate the bandwidth of the PPDU 2. Alternatively, neither the B5 and B6 bits in the scrambler sequence field of the MU-RTS 1 nor the B5 and B6 bits in the scrambler sequence field of the MU-RTS 2 indicate respective bandwidths of PPDUs that carry the MU-RTS 1 and the MU-RTS 2. The AP may generate a same random number for the B5 and B6 bits in the scrambler sequence fields of the MU-RTS 1 and the MU-RTS 2.

Based on the foregoing solution, B5 and B6 bits in the scrambler sequence field may be used to indicate a total bandwidth of data units sent by the AP. Alternatively, when indicated channels for replying CTS frames overlap, B5 and B6 bits in a scrambler sequence field of at least one of MU-RTS frames that indicate the channels for replying the CTS frames may not indicate a bandwidth of a PPDU that carries the MU-RTS frame, and MU-RTS frames indicating that the channels for replying the CTS frames overlap may use a same scrambling code initialization value.

In a possible implementation, the MU-RTS 1 may be carried in the physical protocol data unit 1 (PPDU), and the MU-RTS 2 may be carried in the PPDU 2. End time at which the AP sends the PPDU 1 and the PPDU 2 may be aligned. For example, when the AP sends the PPDU 1 by using a time-domain symbol, the last time domain symbol may be a symbol whose index is 20. Therefore, when the AP sends the PPDU 2 by using a time-domain symbol, the last time domain symbol may also be a symbol whose index is 20.

Optionally, start time of the PPDU 1 and the PPDU 2 may also be aligned, and frame lengths of the PPDU 1 and the PPDU 2 may be the same. For example, the AP may send the PPDU 1 by using 20 time-domain symbols, and the AP may also send the PPDU 2 by using the foregoing 20 time-domain symbols.

In a possible implementation, an uplink bandwidth (uplink bandwidth, UL BW) field in a common information (common info) field of the MU-RTS frame may indicate a bandwidth of a PPDU that carries the MU-RTS frame, or may indicate a total bandwidth of PPDUs sent by the AP. For example, the AP sends a PPDU 0. The PPDU 0 includes a PPDU 1 and a PPDU 2. The PPDU 1 carries an MU-RTS 1, and the PPDU 2 carries an MU-RTS 2. The AP may set a UL BW field of the MU-RTS 1 to a bandwidth of the PPDU 1, or may set the UL BW field to a bandwidth of the PPDU 0. The AP may also set a UL BW of the MU-RTS 2 to a bandwidth of the PPDU 2, or set the UL BW to a bandwidth of the PPDU 0.

Because a plurality of MU-RTS frames sent by the AP are used for a same transmission opportunity TXOP, time reserved for SST STAs should be the same. The reserved time may be time reserved for the SST STA to receive and send data. Therefore, duration fields of the plurality of MU-RTS frames may be set to a same value.

Step 502: The SST STA sends the CTS frame on the first channel.

The SST STA may determine the first channel based on the values of the bit sequences B1 to B7 in the indication information. The following describes a method for determining the first channel based on the values of B1 to B7.

If the values of B1 to B7 are fixed values or in a reserved state, it may be determined that the first channel is the anchor 20 MHz channel of the SST STA.

As shown in FIG. 2, if the anchor 20 MHz channel of the SST STA is the channel 13, and the values of B1 to B7 in the MU-RTS frame received by the SST STA are the fixed values or in the reserved state, the SST STA may send the CTS frame on the channel 13. The SST STA may send the CTS frame on the channel 13 when the channel 13 is idle.

If the values of B1 to B7 are one of the first value to the fourth value, it may be determined that the first channel is the anchor 20 MHz channel of the SST STA. If the values of B1 to B7 are the fifth value or the sixth value, it may be determined that the first channel is the anchor 40 MHz channel of the SST STA. If the values of B1 to B7 are the seventh value, it may be determined that the first channel is the anchor 80 MHz channel of the SST STA. If the values of B1 to B7 are the eighth value, it may be determined that the first channel is the anchor 160 MHz channel of the SST STA.

For the first value to the eighth value herein, refer to related descriptions in Case 1 to Case 4. Details are not described herein again.

As shown in FIG. 2, it is assumed that the operating channel of the SST STA is a 160 MHz channel, and the anchor 20 MHz channel of the SST STA is the channel 13. If the values of B1 to B7 in the MU-RTS frame received by the SST STA are 61, the SST STA may send the CTS frame on the channel 13. If the values of B1 to B7 in the MU-RTS frame received by the SST STA are 65, the SST STA may send the CTS frame on the channel 13 and the channel 14. If the values of B1 to B7 in the MU-RTS frame received by the SST STA are 67, the SST STA may send the CTS frame on the channel 13 to the channel 16. If the values of B1 to B7 in the MU-RTS frame received by the SST STA are 68, the SST STA may send the CTS frame on the channel 9 to the channel 16.

If the values of B1 to B7 are one of the ninth value to the twelfth value, the SST STA may send the CTS frame on the 242-tone RU. The 242-tone RU may be the anchor 20 MHz channel. If the values of B1 to B7 are one of the thirteenth value and the fourteenth value, the SST STA may determine to send the CTS frame on the 484-tone RU. The 484-tone RU may be the anchor 40 MHz channel. If the values of B1 to B7 are the fifteenth value, the SST STA may determine to send the CTS frame on the 996-tone RU. The 996-tone RU may be the anchor 80 MHz channel. If the values of B1 to B7 are the sixteenth value, the SST STA may determine to send the CTS frame on the 2*996-tone RU. The 2*996-tone RU may be the anchor 160 MHz channel.

For the ninth value to the sixteenth value herein, refer to related descriptions in the foregoing method for indicating, by the AP, the RU on which the SST STA sends the CTS frame. Details are not described herein again.

For example, it is assumed that the operating channel of the SST STA is a 160 MHz channel, and the anchor 20 MHz channel of the SST STA is the channel 13. If the values of B1 to B7 in the MU-RTS frame received by the SST STA are 61, the SST STA may send the CTS frame on the anchor 20 MHz channel and the channel 13. If the values of B1 to B7 in the MU-RTS frame received by the SST STA are 65, the SST STA may send the CTS frame on the anchor 40 MHz channel, the channel 13, and the channel 14. If the values of B1 to B7 in the MU-RTS frame received by the SST STA are 66, the SST ST may send the CTS frame on the anchor 80 MHz channel and the channel 13 to the channel 16. If the values of B1 to B7 in the MU-RTS frame received by the SST STA are 68, the SST STA may send the CTS frame on the anchor 160 MHz channel and the channel 9 to the channel 16.

In a possible implementation, the scrambling code initialization value of the CTS frame is the same as the scrambling code initialization value of the MU-RTS frame. For example, the SST STA receives the MU-RTS 1, and the MU-RTS 1 indicates the SST STA to send the CTS frame on the anchor 20 MHz channel. The SST STA may send the CTS frame when the anchor 20 MHz channel is idle. The scrambling code initialization value of the CTS frame is the same as a scrambling code initialization value of the MU-RTS 1.

Based on the foregoing solution, the AP may indicate, to the SST STA by using the MU-RTS frame, the channel for replying the CTS frame, so that the SST STA may also reserve the channel according to the MU-RTS/CTS mechanism, to facilitate follow-up data receiving and sending of the SST STA and the AP. In addition, the AP may send a plurality of MU-RTS frames to indicate, to a plurality of STAs, channels for replying CTS frames, and a same scrambling code initialization value is used in some or all of the plurality of MU-RTS frames, to avoid a conflict between the CTS frames.

Figure 9:
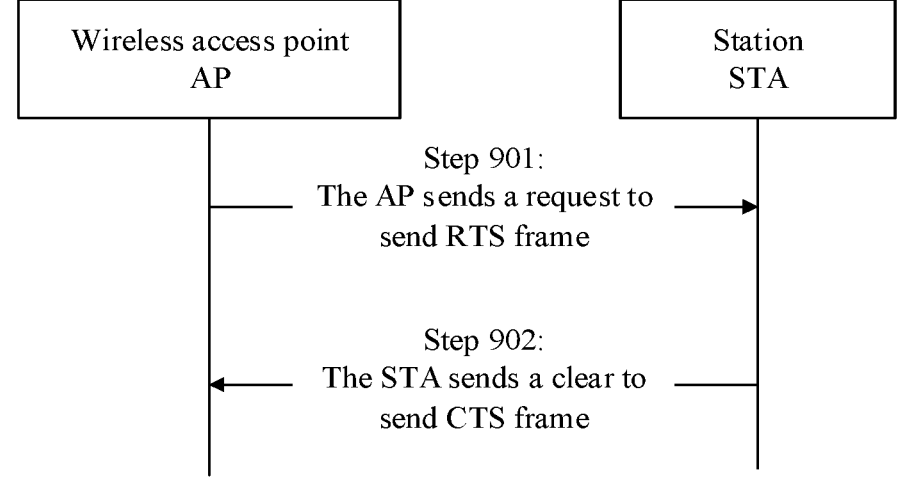
FIG. 9 is an example flowchart of an RTS frame and CTS frame transmission method according to an embodiment of this application.

An embodiment of this application provides an RTS frame and CTS frame transmission method. FIG. 9 is an example flowchart of an RTS frame and CTS frame transmission method according to an embodiment of this application. The method may include the following steps.

Step 901: An AP separately sends an RTS frame on at least two channels.

When the AP sends at least two RTS frames, frame lengths of the at least two RTS frames are the same. For example, the AP sends an RTS 1 and an RTS 2 on at least two channels. The AP uses 13 time-domain symbols to send the RTS 1, and the AP also uses 13 time-domain symbols to send the RTS 2. It should be understood that, at least one of the at least two RTS frames indicates a channel on which an SST STA sends a CTS frame.

In a possible implementation, the AP may send all RTS frames at a first rate. For example, the first rate may be 6 mb/s. This is not specifically limited in this application.

In another possible implementation, when the AP sends a plurality of RTS frames, each RTS frame may be sent at a different rate, or some RTS frames may be sent at different rates. A same main rate may be determined for a rate of each RTS frame. It should be noted that, when a STA sends a CTS frame, the CTS frame may be sent at a main rate. The main rate may be determined by the STA in a first rate set. The main rate is less than or equal to a second rate of the RTS frame. If the first rate set does not include the main rate that is less than or equal to the second rate of the RTS frame, the STA may determine a mandatory rate in a second rate set, to send the CTS frame. The mandatory rate is less than or equal to the second rate of the RTS frame. Therefore, the AP may separately send the RTS frames at different rates. However, to enable frame lengths of a plurality of received CTS frames to be the same, a same main rate or a same mandatory rate may be determined from the foregoing different rates. The STA may send the CTS frame at the determined main rate or mandatory rate as the main rate.

Based on the foregoing solution, the AP may send a plurality of RTS frames at a same rate, or the AP may send a plurality of RTS frames at different rates, but a main rate of one CTS frame may be determined from these different rates. In this way, the AP may control rates at which a plurality of RTS frames are sent, to control the main rate of the CTS frame, and may simultaneously send data to a plurality of STAs within SIFS time after the CTS ends. This avoids a case in which the channel is occupied by a third-party station due to channel idle time greater than an SIFS on a part of subchannels.

When the AP sends a plurality of RTS frames, each STA sends CTS frames on different channel segments, and there is no frequency overlapping. Therefore, dynamic bandwidth negotiation can be implemented. Before dynamic bandwidth negotiation is implemented, an anchor 20 MHz subchannel may be determined for the SST STA, and when sending the CTS frame, the SST STA needs to select a bandwidth including the anchor 20 MHz subchannel. Alternatively, the AP may send the RTS frame by using the method for sending the MU-RTS frame in the embodiment shown in FIG. 5, to indicate a channel or an RU on which the SST STA sends the CTS frame.

Step 902: The STA sends the CTS frame.

In a possible implementation, when sending the CTS frame, the STA may determine a main rate based on the rate of the RTS frame. The main rate may be determined by the STA in the first rate set. The main rate is less than or equal to the rate of the RTS frame. If the first rate set does not include the main rate that is less than or equal to the rate of the RTS frame, the STA may determine a mandatory rate in the second rate set, to send the CTS frame. The mandatory rate is less than or equal to the rate of the RTS frame.

Therefore, the STA may determine a rate in the first rate set or the second rate set, and the STA may send the CTS frame at the determined rate as the main rate.

In another possible implementation, when sending the CTS frame, the STA may send the CTS frame at a fixed rate. For example, the CTS frame may be sent at a rate of 6 mb/s. It should be understood that the fixed rate may be predetermined based on an empirical value, or may be specified in a communication protocol. This is not specifically limited in this application.

In still another possible implementation, when sending the CTS frame, the STA may send the CTS frame at an alternative rate. It should be noted that a frame length of the CTS frame sent at the alternative rate is the same as a frame length of the CTS frame sent at the fixed rate. For example, if the STA occupies 12 time-domain symbols when sending the CTS frame at the fixed rate, the CTS frame also occupies 12 time-domain symbols when the STA sends the CTS frame at the alternative rate.

Based on the foregoing solution, the STA may send the CTS frame at the fixed rate, or different STAs may send the CTS frames at the different rates, but frame lengths of the CTS frames sent at different rates are the same as a frame length of the CTS frame sent at the fixed rate. In this way, the frame lengths of the plurality of CTS frames received by the AP may be the same. The AP may simultaneously send data to a plurality of STAs within SIFS time after the CTS ends. This avoids a case in which the channel is occupied by a third-party station due to channel idle time greater than an SIFS on a part of subchannels.

Figure 10:
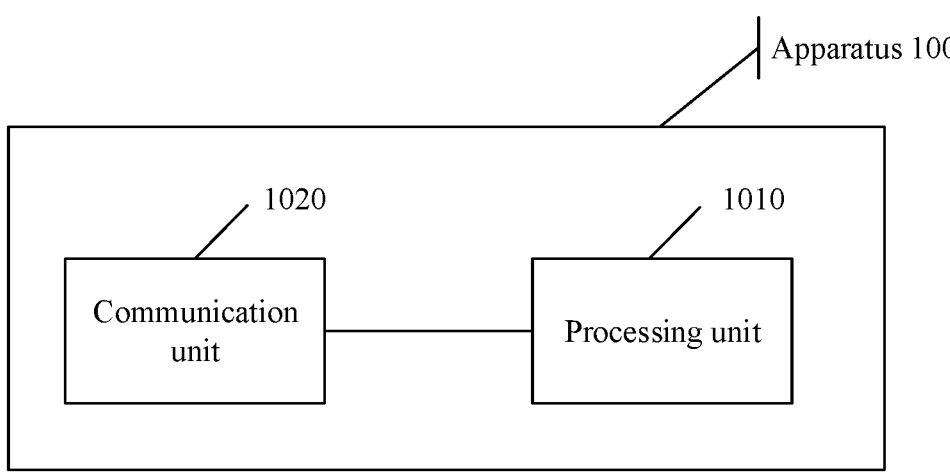
FIG. 10 is a schematic diagram of an apparatus having a communication function according to an embodiment of this application.

FIG. 10 is a schematic block diagram of an apparatus 1000 having a communication function according to an embodiment of this application. The apparatus 1000 may be the MU-RTS frame transmission apparatus mentioned in embodiments of this application, or may be the protocol data unit PPDU transmission apparatus mentioned in embodiments of this application, or may be the request to send RTS frame transmission apparatus mentioned in embodiments of this application. The apparatus 1000 may correspondingly implement functions or steps implemented by a first device in the foregoing method embodiments. The apparatus may include a processing unit 1010 and a communication unit 1020. Optionally, the apparatus may further include a storage unit. The storage unit may be configured to store instructions (code or a program) and/or data. The processing unit 1010 and the communication unit 1020 may be coupled to the storage unit. For example, the processing unit 1010 may read the instructions (the code or the program) and/or the data in the storage unit, to implement a corresponding method. The foregoing units may be independently disposed, or may be partially or completely integrated.

In some possible implementations, the apparatus 1000 can correspondingly implement behavior and functions of the first device in the method embodiments. For example, the apparatus 1000 may be an AP, or may be a component (for example, a chip or a circuit) used in the AP. The communication unit 1020 may be configured to perform all receiving or sending operations performed by the first device in the embodiment shown in FIG. 5 or FIG. 9, for example, the step 501 and the step 502 in the embodiment shown in FIG. 5, and/or configured to support another process of the technology described in this specification, for example, the step 901 and the step 902 in the embodiment shown in FIG. 9, and/or configured to support another process of the technology described in this specification. The processing unit 1010 is configured to perform all operations, such as generating an MU-RTS frame, or generating a first data unit, or generating an RTS frame, that are performed by the first device in the embodiment shown in FIG. 5 or FIG. 9 other than the receiving and sending operations, and/or configured to support another process of the technology described in this specification.

It should be understood that the processing unit 1010 in embodiments of this application may be implemented by a processor or a processor-related circuit component, and the communication unit 1020 may be implemented by a transceiver, a transceiver-related circuit component, or a communication interface.

In an example, the processing unit 1010 is configured to generate an MU-RTS frame. The MU-RTS frame may include indication information indicating a first channel. The first channel herein is a first channel on which a second device sends a CTS frame. The first channel includes a target channel of the second device. The target channel may be a 20 MHz subchannel in an operating channel of an SST STA. Alternatively, the target channel may be any 20 MHz subchannel other than a primary 20 MHz channel. The communication unit 1020 is configured to send the MU-RTS frame.

For the indication information and the first channel, refer to related descriptions in the method embodiment shown in FIG. 5 or FIG. 9. Details are not described herein again.

In an example, the processing unit 1010 generates a first data unit. The first data unit includes at least a second data unit and a third data unit. The second data unit is used to carry a first multi-user request to send MU-RTS frame. The third data unit is used to carry a second MU-RTS frame. The first MU-RTS frame and the second MU-RTS frame use a same scrambling code initialization value. The communication unit 1020 is configured to send the first data unit.

For the scrambling code initialization value, refer to related descriptions in the method embodiment shown in FIG. 5 or FIG. 9. Details are not described herein again.

In an example, the processing unit 1010 is configured to generate a plurality of request to send RTS frames. The communication unit 1020 is configured to separately send an RTS frame on at least two channels. The communication unit 1020 is further configured to receive clear to send CTS frames with a same frame length on the at least two channels.

For the RTS frame and the CTS frame, refer to related descriptions in the method embodiment shown in FIG. 5 or FIG. 9. Details are not described herein again.

In some possible implementations, the apparatus may be the clear to send CTS frame transmission apparatus mentioned in embodiments of this application. The apparatus 1000 can correspondingly implement behavior and functions of the second device in the foregoing method embodiments. For example, the apparatus 1000 may be a STA, or may be a component (for example, a chip or a circuit) used in the STA. The communication unit 1020 may be configured to perform all receiving or sending operations performed by the second device in the embodiment shown in FIG. 5 or FIG. 9, for example, the step 501 and the step 502 in the embodiment shown in FIG. 5, and/or configured to support another process of the technology described in this specification, for example, the step 901 and the step 902 in the embodiment shown in FIG. 9, and/or configured to support another process of the technology described in this specification. The processing unit 1010 is configured to perform all operations, such as generating a CTS frame, that are performed by the second device in the embodiment shown in FIG. 5 or FIG. 9 other than the receiving and sending operations, and/or configured to support another process of the technology described in this specification.

In an example, the communication unit 1020 is configured to receive an MU-RTS frame. The MU-RTS frame may include indication information. The indication information herein may indicate a first channel. The first channel includes a target channel of the second device. The target channel may be a 20 MHz subchannel in an operating channel of an SST STA. Alternatively, the target channel may be any 20 MHz subchannel other than a primary 20 MHz channel. The processing unit 1010 is configured to generate a CTS frame. The communication unit is further configured to send a CTS frame on the first channel.

For the indication information and the first channel, refer to related descriptions in the method embodiment shown in FIG. 5 or FIG. 9. Details are not described herein again.

In an example, the processing unit 1010 is configured to generate a plurality of request to send RTS frames. The communication unit 1020 is configured to separately send an RTS frame on at least two channels. The communication unit 1020 is further configured to receive clear to send CTS frames with a same frame length on the at least two channels.

For the RTS frame and the CTS frame, refer to related descriptions in the method embodiment shown in FIG. 5 or FIG. 9. Details are not described herein again.

It should be understood that the processing unit 1010 in embodiments of this application may be implemented by a processor or a processor-related circuit component, and the communication unit 1020 may be implemented by a transceiver, a transceiver-related circuit component, or a communication interface.

Figure 11:
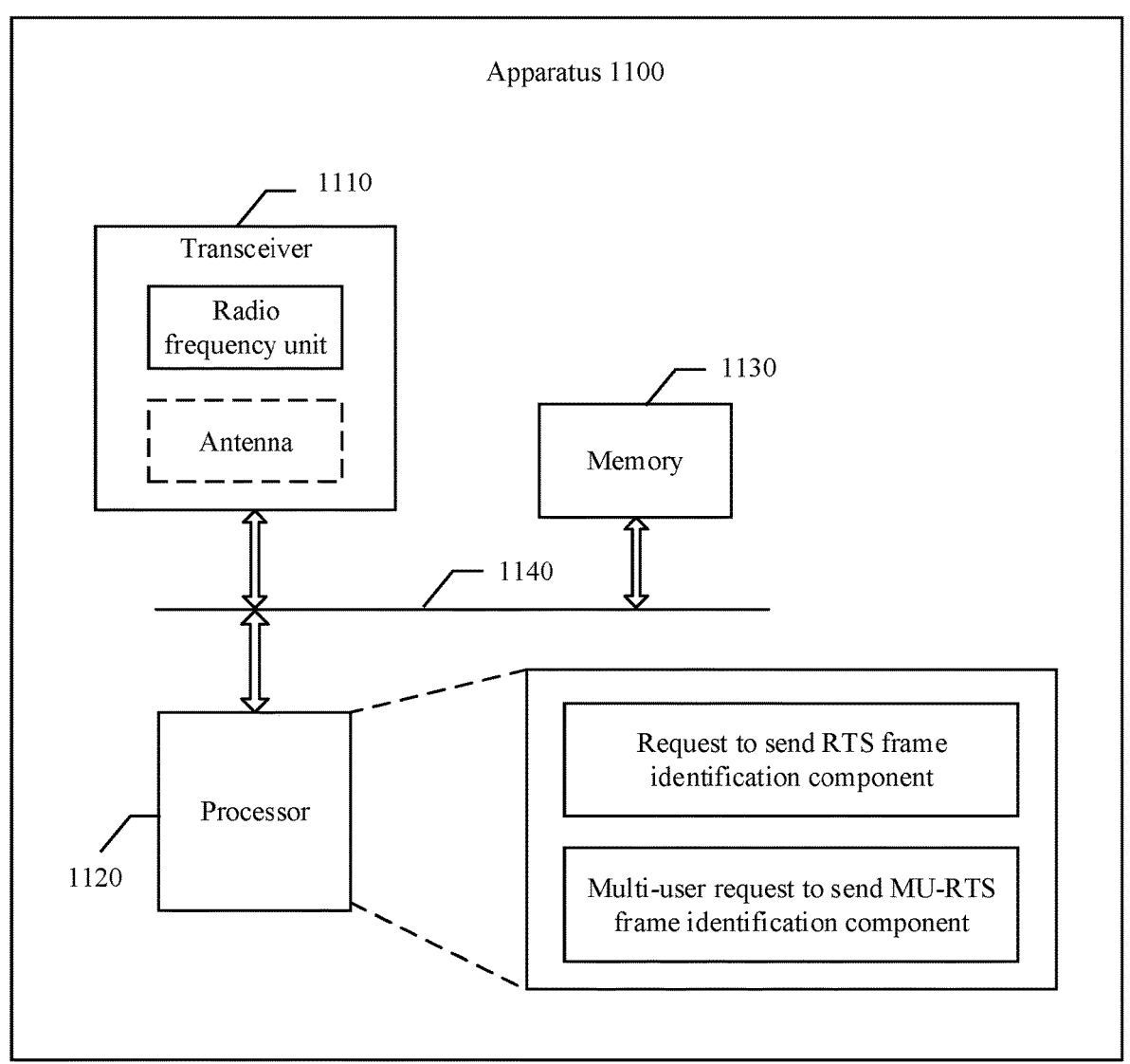
FIG. 11 is a schematic diagram of an apparatus having a communication function according to an embodiment of this application.

FIG. 11 shows an apparatus 1100 having a communication function according to an embodiment of this application. The apparatus 1100 may be a first device, and can implement a function of the first device in the methods provided in embodiments of this application. Alternatively, the apparatus 1100 may be a second device, and can implement a function of the second device in the methods provided in embodiments of this application. The apparatus 1100 may alternatively be an apparatus that can support a first device in implementing a corresponding function in the methods provided in embodiments of this application, or an apparatus that can support a second device in implementing a corresponding function in the methods provided in embodiments of this application. The apparatus 1100 may be a chip or a chip system. In this embodiment of this application, the chip system may include a chip, or may include a chip and another discrete component.

It should be understood that the apparatus 1100 may be the MU-RTS frame transmission apparatus mentioned in embodiments of this application, or may be the protocol data unit PPDU transmission apparatus mentioned in embodiments of this application, or may be the request to send RTS frame transmission apparatus mentioned in embodiments of this application, or may be the clear to send CTS frame transmission apparatus mentioned in embodiments of this application.

In hardware implementation, the communication unit 1020 may be a transceiver 1110.

The apparatus 1100 includes at least one processor 1120, configured to implement or support the apparatus 1100 in implementing a function of the first device or the second device in the methods provided in embodiments of this application, for example, indicate, based on values of B1 to B7, a channel for replying a CTS frame. The processor may include an MU-RTS frame identification component and/or an RTS frame identification component. The MU-RTS frame identification component and/or the RTS frame identification component may be configured to perform the steps performed by the first device and the second device provided in embodiments of this application.

The apparatus 1100 may further include at least one memory 1130, configured to store program instructions and/or data. The memory 1130 is coupled to the processor 1120. The coupling in this embodiment of this application may be an indirect coupling or a communication connection between apparatuses, units, or modules in an electrical form, a mechanical form, or another form, and is used for information exchange between the apparatuses, the units, or the modules. The processor 1120 may operate with the memory 1130. The processor 1120 may execute the program instructions and/or the data stored in the memory 1130, so that the apparatus 1100 implements a corresponding method. At least one of the at least one memory may be located in the processor.

The apparatus 1100 may further include a transceiver 1110, configured to communicate with another device through a transmission medium, so that an apparatus in the apparatus 1100 may communicate with another device. For example, when the apparatus is an AP, the another device is a STA. Alternatively, when the apparatus is a STA, the another device is an AP. The processor 1120 may receive data and send data by using the transceiver 1110. The transceiver 1110 may be specifically a transceiver. The apparatus 1100 may further be a radio frequency unit. The radio frequency unit may be independent of the apparatus 1100, or may be integrated into the apparatus 1100. Certainly, the transceiver 1110 may further include an antenna, for example, a remote antenna independent of the apparatus 1100, or an antenna integrated into the apparatus 1100.

A specific connection medium between the transceiver 1110, the processor 1120, and the memory 1130 is not limited in this embodiment of this application. In this embodiment of this application, the memory 1130, the processor 1120, and the transceiver 1110 are connected through a bus 1140 in FIG. 11. The bus is represented by using a thick line in FIG. 11. A manner of a connection between other components is merely an example for description, and is not limited thereto. The bus may be classified into an address bus, a data bus, a control bus, and the like. For ease of representation, only one thick line is used to represent the bus in FIG. 11, but this does not mean that there is only one bus or only one type of bus.

In this embodiment of this application, the processor 1120 may be a general-purpose processor, a digital signal processor, an application-specific integrated circuit, a field programmable gate array or another programmable logic device, a discrete gate or transistor logic device, or a discrete hardware component, and can implement or perform the methods, steps, and logical block diagrams disclosed in embodiments of this application. The general-purpose processor may be a microprocessor or any conventional processor or the like. The steps of the methods disclosed with reference to embodiments of this application may be directly performed by a hardware processor, or may be performed by using a combination of hardware in the processor and a software module.

In this embodiment of this application, the memory 1130 may be a non-volatile memory, for example, a hard disk drive (HDD) or a solid-state drive (SSD), or may be a volatile memory, for example, a random access memory (random-access memory, RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

It should be noted that the apparatus in the foregoing embodiments may be a terminal, a circuit, a chip used in a terminal, or another combined device or component that has a function of the terminal. When the apparatus is the terminal, the communication unit may be a transceiver, and may include an antenna, a radio frequency circuit, and the like. The processing unit may be a processor, for example, a central processing module (central processing unit, CPU). When the apparatus is a component having the function of the terminal, the communication unit may be a radio frequency unit, and the processing unit may be a processor. When the apparatus is a chip or a chip system, the communication unit may be an input/output interface of the chip or the chip system, and the processing unit may be a processor of the chip or the chip system.

As a possible product form, the AP or STA described in this embodiment of this application may further be implemented by using the following components: one or more FPGAs (field programmable gate arrays), a PLD (programmable logic device), a controller, a state machine, gate logic, a discrete hardware component, any other suitable circuit, or any combination of circuits that can perform various functions described in this application.

It should be understood that the APs in various product forms have any function of the AP in the foregoing method embodiments. Details are not described herein again. The STAs in various forms have any function of the STA in the foregoing method embodiments. Details are not described herein again.

An embodiment of this application further provides a communication system. Specifically, the communication system includes a STA and an AP, or may further include more APs and STAs. For example, the communication system includes a STA and an AP that are configured to implement a related function in FIG. 5 or FIG. 9.

The AP is separately configured to implement related functions of AP parts in FIG. 5 or FIG. 9. The STA is configured to implement related functions of the STA in FIG. 5 or FIG. 9. For example, the STA may perform the step 501 and the step 502 in the embodiment shown in FIG. 5, and the AP may perform the step 501 and the step 502 in the embodiment shown in FIG. 5. For another example, the STA may perform the step 901 and the step 902 in the embodiment shown in FIG. 9, and the AP may perform the step 901 and the step 902 in the embodiment shown in FIG. 9.

An embodiment of this application further provides a computer-readable storage medium, including instructions. When the instructions are run on a computer, the computer is enabled to perform the method performed by the AP or the STA in FIG. 5 or FIG. 9.

An embodiment of this application further provides a computer program product, including computer program code. When the computer program code is run on a computer, the computer is enabled to perform the method performed by the AP or the STA in FIG. 5 or FIG. 9.

An embodiment of this application provides a chip system. The chip system includes a processor and may further include a memory, and is configured to implement a function of the AP or STA in the foregoing methods. The chip system may include a chip, or may include a chip and another discrete component.

An embodiment of this application further provides an apparatus, including a processor and an interface. The processor is configured to perform the method in each aspect in any one of the foregoing method embodiments.

It should be understood that the apparatus may be a chip. The processor may be implemented by hardware, or may be implemented by software. When the processor is implemented by the hardware, the processor may be a logic circuit, an integrated circuit, or the like. When the processor is implemented by the software, the processor may be a general-purpose processor, and is implemented by reading software code stored in a memory. The memory may be integrated into the processor, or may be located outside the processor and exist independently.

It should be understood that the terms "system" and "network" may be used interchangeably in embodiments of this application. "At least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, first information and second information are merely used to distinguish between different information, and do not indicate different priorities, importance, or the like of the two types of information.

It should be understood that sequence numbers of the foregoing processes do not mean execution sequences in various embodiments of this application. The execution sequences of the processes should be determined according to functions and internal logic of the processes, and should not be construed as any limitation on implementation processes of embodiments of this application.

In addition, the term "for example" in embodiments of this application is used to represent an example or a description. Any embodiment or implementation solution described as an "example" in embodiments of this application should not be explained as being more preferred than another embodiment or implementation solution. That is, the word "example" is used to present a concept in a specific manner.

All or some of the methods in embodiments of this application may be implemented by using software, hardware, firmware, or any combination thereof. When the software is used to implement embodiments, all or some of the embodiments may be implemented in a form of a computer program product. The computer program product includes one or more computer instructions. When the computer program instructions are loaded and executed on the computer, the procedures or functions according to embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

It is clearly that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A protocol data unit (PPDU) transmission method, comprising:

sending, by a first device, a first data unit, wherein the first data unit comprises at least a second data unit and a third data unit, the second data unit carries a first multi-user request to send (MU-RTS) frame, and the third data unit carries a second MU-RTS frame, wherein the first MU-RTS frame and the second MU-RTS frame use a same scrambling code initialization value;

the first MU-RTS frame indicates a first channel on which a second device shall send a clear to send (CTS) frame, and the first channel includes a target channel different from a primary channel of the second device; and the second MU-RTS frame indicates a second channel on which a third device shall send a CTS frame, and the second channel includes a target channel different from a primary channel of the third device.

2. The method according to claim 1, wherein a bandwidth of the first channel partially or completely overlaps a bandwidth of the second channel.

3. The method according to claim 1, wherein the first data unit comprises at least one data unit in addition to the second and third data units, each of the data units comprised in the first data unit carries an MU-RTS frame, and scrambling code initialization values of all the MU-RTS frames are the same.

4. The method according to claim 1, wherein the first MU-RTS frame and the second MU-RTS frame each comprise a first bit sequence, and the first bit sequence indicates a bandwidth of the first data unit; or the first MU-RTS frame comprises a second bit sequence, the second bit sequence indicates a bandwidth of the second data unit, the second MU-RTS frame comprises a third bit sequence, and the third bit sequence indicates a bandwidth of the third data unit.

5. A request to send (RTS) frame transmission method, comprising:

separately sending, by a first device, a request to send RTS frame on at least two channels, wherein the RTS frame indicates a first channel on which a second device sends a clear to send (CTS) frame, and the first channel includes a target channel different from a primary channel of the second device; and receiving, by the first device, CTS frames with a same frame length on the at least two channels.

6. The method according to claim 5, wherein frame lengths of all RTS frames are the same.

7. The method according to claim 5, wherein first transmit rates of all RTS frames are the same; or a first transmit rate of each RTS frame is used to determine a same second transmit rate, and the second transmit rate is a main rate at which a second device sends the CTS frame.

8. A protocol data unit (PPDU) transmission apparatus, comprising a processor and a memory, the memory is configured to store a computer program, and the processor is configured to execute the computer program stored in the memory, to enable the first multi-link device to perform generating a first data unit, wherein the first data unit comprises at least a second data unit and a third data unit, the second data unit carries a first multi-user request to send (MU-RTS) frame, the third data unit carries a second MU-RTS frame, wherein the first MU-RTS frame and the second MU-RTS frame use a same scrambling code initialization value;

the first MU-RTS frame indicates a first channel on which a second device shall send a clear to send (CTS) frame, and the first channel includes a target channel different from a primary channel of the second device; and the second MU-RTS frame indicates a second channel on which a third device shall send a CTS frame, and the second channel includes a target channel different from a primary channel of the third device; and sending the first data unit.

9. The apparatus according to claim 8, wherein a bandwidth of the first channel partially or completely overlaps a bandwidth of the second channel.

10. The apparatus according to claim 8, wherein the first data unit comprises at least one data unit in addition to the second and third data units, each of the data units comprised in the first data unit carries an MU-RTS frame, and scrambling code initialization values of all the MU-RTS frames are the same.

11. The apparatus according to claim 8, wherein the first MU-RTS frame and the second MU-RTS frame each comprise a first bit sequence, and the first bit sequence indicates a bandwidth of the first data unit; or the first MU-RTS frame comprises a second bit sequence, the second bit sequence indicates a bandwidth of the second data unit, the second MU-RTS frame comprises a third bit sequence, and the third bit sequence indicates a bandwidth of the third data unit.

\* \* \* \* \*